(12) United States Patent
Shoji et al.

(10) Patent No.: US 6,177,030 B1
(45) Date of Patent: Jan. 23, 2001

(54) STIMULABLE PHOSPHOR AND RADIATION IMAGE CONVERSION PANEL BY USE THEREOF

(75) Inventors: Takehiko Shoji; Satoshi Honda; Manabu Watanabe; Masaaki Murayama; Yasushi Nakano; Haruhiko Masutomi; Hideaki Wakamatsu; Hiroyuki Nabeta; Kanae Kawabata, all of Hino (JP)

(73) Assignee: Konica Corporation, Tokyo (JP)

( * ) Notice: Under 35 U.S.C. 154(b), the term of this patent shall be extended for 0 days.

(21) Appl. No.: 09/294,937

(22) Filed: Apr. 19, 1999

(30) Foreign Application Priority Data

| Apr. 23, 1998 | (JP) | ................................. | 10-129481 |
| Apr. 23, 1998 | (JP) | ................................. | 10-129482 |
| May 29, 1998 | (JP) | ................................. | 10-166407 |
| Sep. 3, 1998 | (JP) | ................................. | 10-265650 |
| Sep. 24, 1998 | (JP) | ................................. | 10-269913 |

(51) Int. Cl.$^7$ ............................. C09K 11/61; C09K 11/55
(52) U.S. Cl. ......................... 252/301.4 H; 252/301.4 R; 427/64; 427/215; 427/214
(58) Field of Search .................................... 428/403, 404; 427/64, 215, 214; 252/301.4 R, 301.4 H

(56) References Cited

FOREIGN PATENT DOCUMENTS

| 293129 | * | 8/1991 | (DE) | ............................. | 252/301.4 H |
| 63-182392 | * | 7/1988 | (JP) | ............................. | 252/301.4 H |
| 1-110590 | * | 4/1989 | (JP) | ............................. | 252/301.4 H |

* cited by examiner

Primary Examiner—C. Melissa Koslow
(74) Attorney, Agent, or Firm—Frishauf, Holtz, Goodman, Langer & Chick, P.C.

(57) ABSTRACT

A method for preparing a stimulable phosphor is disclosed, comprising forming a stimulable phosphor and coating the formed stimulable phosphor with a metal oxide and a silane coupling agent, or a metal oxide and a metal alkoxide. Another method is also disclosed, comprising forming a stimulable phosphor precursor, calcining the formed precursor in the presence of a metal oxide or metal alkoxide, and coating the calcined precursor with a silane coupling agent or metal alkoxide. Further disclosed is a preparation method of a radiation image conversion panel containing the stimulable phosphor.

33 Claims, No Drawings

STIMULABLE PHOSPHOR AND RADIATION IMAGE CONVERSION PANEL BY USE THEREOF

FIELD OF THE INVENTION

The present invention relates to a stimulable phosphor, a preparation method of the stimulable phosphor and radiation image conversion panel by the use of the stimulable phosphor, and in particular to a stimulable phosphor which are little in deterioration of performance due to moisture sorption and usable in acceptable conditions over a long period of time, a preparation method of the stimulable phosphor and radiation image conversion panel by the use of the stimulable phosphor.

BACKGROUND OF THE INVENTION

Radiographic images such as X-ray photographic images are generally employed for medical diagnoses. To obtain X-ray photographic images is generally employed conventional X-ray photography. Thus, X-rays, having passed through a photographic object, are allowed to be irradiated onto a phosphor layer (fluorescent screen) to produce visible light, and the visible light produced is irradiated onto a conventionally used silver salt film, which is further developed to obtain the images. Recently, there is known a method of taking out images directly form a phosphor layer without the use of the silver salt film. The radiation, having passed through an object, is allowed to be absorbed in the phosphor, then the phosphor is excited by light or heat energy to release the radiation energy stored in the phosphor as fluorescence, and the resulting fluorescence is detected to form images. Exemplarily, there is known a radiation image conversion method using a stimulable phosphor, as disclosed in U.S. Pat. No. 3,859,527 and JP-A 55-12144 (hereinafter, the term, JP-A means a Unexamined and Published Japanese Patent Application).

In the method, a radiation image conversion panel (in other words, an image storage phosphor sheet) comprising a stimulable phosphor is employed, and the method comprises the steps of causing the stimulable phosphor of the panel to absorb radiation which passed through an object or having radiated from an object, sequentially exciting the stimulable phosphor with a electromagnetic waves such as visible light or infrared rays (hereinafter referred to as "stimulating rays") to release the radiation energy stored in the phosphor as light emission (stimulated emission), photoelectrically detecting the emitted light to obtain electrical signals, and reproducing the radiation image of the object as a visible image from the electrical signals.

In the radiation image recording and reproducing methods described above, a radiation image is advantageously obtained with a sufficient amount of information by applying radiation to an object in a considerably smaller dose, as compared to conventional radiography employing a combination of a radiographic film and a radiographic intensifying screen.

The stimulable phosphor, after being exposed to radiation, exhibits stimulated emission upon exposure to the stimulating ray. In practical use, phosphors are employed, which exhibit an emission within a wavelength region of 300 to 500 nm stimulated by stimulating light at wavelengths of 400 to 900 nm.

Examples of the stimulable phosphor used in the radiation image conversion panel include, (1) a rare earth activated alkaline earth metal fluorohalide phosphor represented by the formula of $(Ba_{1-x}, M^{2+}_x)$ FX:yA, as described in JP-A 55-12145, in which $M^{2+}$ is at least one of Mg, Ca, Sr, Zn and Cd; X is at least one of Cl, Br and I; A is at least one of Eu, Tb, Ce, Tm, Dy, Pr, Ho, Nd, Yb, and Er; x and y are numbers meeting the conditions of $0 \leq x \leq 0.6$ and $0 \leq y \leq 0.2$; and the phosphor may contain the following additives:

X', BeX" and $M^3X_3'''$, as described in JP-A 56-74175 (in which X', X" and X''' are respectively a halogen atom selected from the group of CL, Br and I; and $M^3$ is a trivalent metal);

a metal oxide described in JP-A 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$ or $ThO_2$;

Zr and Sc described in JP-A 56-116777;

B described in JP-A 57-23673; As and Si described in JPA 57-23675;

M.L (in which M is an alkali metal selected from the group of Li, Na, K, Rb and Cs; L is a trivalent metal Sc, Y, La, Ce, Pr, Nd, Pm, Sm, Gd, Tb, Dy, Ho, Er, Tm, Yb, Lu, Al, Ga, In, and Tl) described in JP-A 58-206678;

calcined tetrafluoroboric acid compound described in JPA 59-27980;

calcined, univalent or divalent metal salt of hexafluorosilic acid, hexafluorotitanic acid or hexafluorozirconic acid described in JP-A 59-27289;

NaX' described in JP-A 59-56479 (in which X' is at least one of Cl, Br and I);

a transition metal such as V, Cr, Mn, Fe, Co or Ni, as described in JP-A 59-56479;

$M^1X'$, $M^{i2}X''$, $M^3X'''$ and A, as described in JP-A 59-75200 (in which $M^1$ is an alkali metal selected from the group of Li, Na, K, Rb and Cs; $M^{i2}$ is a divalent metal selected from the group of Be and Mg; $M^3$ is a trivalent metal selected from the group Al, Ga, In and Tl; A is a metal oxide; X', X" and X''' are respectively a halogen atom selected from the group of F, Cl, Br and I);$M^1X'$ described in JP-A 60-101173 (in which $M^1$ is an alkali metal selected from the group of Rb and Cs; and X' is a halogen atom selected from the group of F, Cl, Br and I);

$M^{2'}X'_2 \cdot M^{2'}X''_2$ (in which $M^{2'}$ is at least an alkaline earth metal selected from the group Ba, Sr and Ca; X' and X" are respectively a halogen atom selected from the group of Cl, Br and I, and $X' \neq X"$); and $LnX''_3$ described in Japanese Patent Application No. 60106752 (in which Ln is a rare earth selected from the group of Sc, Y, La, Ce, Pr, Nd, Pm, Sm, Gd, Tb, Dy, Ho, Er, Tm, Yb and Lu; X" is a halogen atom selected from the group of F, Cl, Br and I);

(2) a divalent europium activated alkaline earth metal halide phosphor described in JP-A 60-84381, represented by the formula of $M^2X_2 \cdot aM^{2'}_2 : xEu^{2+}$ (in which $M^2$ is an alkaline earth metal selected from the group of Ba, Sr and Ca; X and X' is a halogen atom selected from the group of Cl, Br and I and $X \neq X'$; a and x are respectively numbers meeting the requirements of $0 \leq a \leq 0.1$ and $0 \leq x \leq 0.2$);

the phosphor may contain the following additives;

$M^1X"$ described in JP-A 60-166379 (in which $M^1$ is an alkali metal selected from the group of Rb, and Cs; X" is a halogen atom selected from the group of F, Cl, Br and I;

$KX"$, $MgX_2'''$ and $M^3 X_3''''$ described in JP-A 221483 (in which $M^3$ is a trivalent metal selected from the group of Sc, Y, La Gd and Lu; X", X''' and X'''' are respectively a halogen atom selected from the group of F, Cl Br and I;
B described in JP-A 60-228592;
an oxide such as $SiO_2$ or $P_2O_5$ described in JP-A 60-228593;
LiX" and NaX" (in which X" is a halogen atom selected from the group of F, Cl, Br and I;
SiO described in JP-A 61-120883;
$SnX_2$" described in JP-A 61-120885 (in which X" is a halogen atom selected from the group of F, Cl, Br and I;
CsX" and $SnX_2$'" described in JP-A 61-235486 (in which X" and X'" are respectively a halogen atom selected from the group of F, Cl, Br and I;
CsX" and $Ln^{3+}$ described in JP-A 61-235487 (in which X" is a halogen atom selected from the group of F, Cl, Br and I; Ln is a rare earth element selected from the group of Sc, Y, Ce, Pr, Nd, Sm, Gd, Tb, Dy, Ho, Er, Tm, Yb and Lu;

(3) a rare earth element activated rare earth oxyhalide phosphor represented by the formula of LnOX:xA, as described in JP-A 55-12144 (in which Ln is at least one of La, Y, Gd and Lu; A is at least one of Ce and Tb; and x is a number meeting the following condition, 0<x<0.1);

(4) a cerium activated trivalent metal oxyhalide phosphor represented by the formula of $M^3OX$:xCe, as described in JP-A 58-69281 (in which $M^3$ is an oxidized metal selected from the group of Pr, Nd, Pm, Sm, Eu, Tb, Dy, Ho, Er, Tm, Yb and Bi; X is a halogen atom selected from the group of Cl, Br and I; x is a number meeting the following condition, 0<x<0.1;

(5) a bismuth activated alkali metal halide phosphor represented by the formula of $M^1X$:xBi, as described in Japanese Patent Application No.60-70484 (in which $M^1$ is an alkali metal selected from the group of Rb and Cs; X is a halogen atom selected from the group of Cl, Br and I; x is a number meeting the following condition, $0<x\leq0.2$;

(6) a divalent europium activated alkaline earth metal halophosphate phosphor represented by the formula of $M^2_5(PO_4)_3X$:$xEu^{2+}$, as described in JP-A 60-141783 (in which $M^2$ is an alkaline earth metal selected from the group of Ca, Sr and Ba; X is a halogen atom selected from the group of F, Cl, Br and I; x is a number meeting the following condition, $0<x\leq0.2$);

(7) a divalent europium activated alkaline earth metal haloborate phosphor represented by the formula of $M^2_2BO_3X$:$xEu^{2+}$, as described in JP-A 60 157099 (in which $M^2$ is an alkaline earth metal selected from the group of Ca, Sr and Ba; X is a halogen atom selected from the group of Cl, Br and I; x is a number meeting the following condition, $0<x\leq0.2$);

(8) a divalent europium activated alkaline earth metal halophosphate phosphor represented by the formula of $M^2_2PO_4X$:$xEu^{2+}$, as described in JP-A 60-157100 (in which $M^2$ is an alkaline earth metal selected from the group of Ca, Sr and Ba; X is a halogen atom selected from the group of Cl, Br and I; x is a number meeting the following condition, $0<x\leq0.2$);

(9) a divalent europium activated alkaline earth metal hydrogenated halide phosphor represented by the formula of $M^2HX$:$xEu^{2+}$, as described in JP-A 60-217354 (in which $M^2$ is an alkaline earth metal selected from the group of Ca, Sr and Ba; X is a halogen atom selected from the group of Cl, Br and I; x is a number meeting the following condition, $0<x\leq0.2$);

(10) a cerium activated rare earth complex halide phosphor represented by the formula of $LnX_3.aLn'X_3'$:$xCe^{3+}$, as described in JP-A 61-21173 (in which Ln and Ln' are respectively a rare earth element selected from the group of Y, La, Gd and Lu; X and X' are respectively a halogen atom selected from the group of F, Cl, Br and I and X≠X'; a and x are respectively numbers meeting the following conditions, $0.1<a\leq10.0$ and $0<x\leq0.2$;

(11) a cerium activated rare earth complex halide phosphor represented by the formula of $LnX_3.aM^1X'$:$xCe^{3+}$, as described in JP-A 61-21182 (in which Ln and Ln' are respectively a rare earth element selected from the group of Y, La, Gd and Lu; $M^1$ is an alkali metal selected from the group of Li, Na, k, Cs and Rb; X and X' are respectively a halogen atom selected from the group of Cl, Br and I; a and x are respectively numbers meeting the following conditions, $0.1<a\leq10.0$ and $0<x\leq0.2$;

(12) a cerium activated rare earth halophosphate phosphor represented by the formula of $LnPO_4.aLnX_3$:$xCe^{3+}$, as described in JP-A 61-40390 (in which Ln is a rare earth element selected from the group of Y, La, Gd and Lu; X is a halogen atom selected from the group of F, Cl, Br and I; a and x are respectively numbers meeting the following conditions, $0.1<a\leq10.0$ and $0<x\leq0.2$;

(13) a divalent europium activated cesium rubidium halide phosphor represented by the formula of CsX:aRbX':$xEuM^{2+}$, as described in Japanese Patent Application No. 60-78151 (in which X and X' are respectively a halogen atom selected from the group of Cl, Br and I; a and x are respectively numbers meeting the following conditions, $0.1<a\leq10.0$ and $0<x\leq0.2$;

(14) a divalent europium activated complex halide phosphor represented by the formula of $M^2X_2.aM^1X'$:$xEu^{2+}$, as described in Japanese Patent Application No.60-78153 (in which $M^2$ is an alkaline earth metal selected from the group of Ba, Sr and Ca; $M^1$ is an alkali metal selected from the group of Li, Rb and Cs; X and X' are respectively a halogen atom selected from the group of Cl, Br and I; a and x are respectively numbers meeting the following conditions, $0.1<a\leq20.0$ and $0<x\leq0.2$.

Of stimulable phosphors above-described, an iodide-containing divalent europium activated alkaline earth metal fluorohalide phosphor, an iodide-containing divalent europium activated alkaline earth metal halide phosphor, an iodide containing rare earth element activated rare earth oxyhalide phosphor and an iodide-containing bismuth activated alkaline metal halide phosphor each exhibit stimulated emission with high luminance.

The radiation image conversion panel using a stimulable phosphor, after storage of radiation image information, releases stored energy by scanning the panel with stimulating light so that after scanning, radiation images can again be stored. Thus, the radiation image conversion panel can be used repeatedly. In the conventional radiography, a sheet of the radiographic film is consumed for each photograph; on the other hand, this radiation image converting method, in which the radiation image conversion panel is employed repeatedly, is also advantageous in terms of conservation of resources and economical efficiency.

Accordingly, there is desired a radiation image conversion panel capable of use over a long period of time without deteriorating.

However, stimulable phosphors used in the radiation image conversion panel generally have a marked tendency of moisture sorption. When allowed to stand under ordinary climatic conditions, the stimulable phosphor absorbs atmospheric moisture and markedly deteriorates over elapsed time.

When allowed to stand under high humidity, for example, sensitivity to radiation of the stimulable phosphor is lowered with an increase of adsorbed moisture. Latent images of radiation images recorded in the stimulable phosphor generally fade over time after exposure to radiation, exhibiting the tendency that the longer the time between exposure to radiation and scanning with stimulating light, the smaller the reproduced radiation image signal intensity. Thus, moisture sorption of the stimulable phosphor accelerates the latent image fading. The use of a radiation image conversion panel comprised of a moisture-sorbed stimulable phosphor leads to deteriorated reproduction of signals when reading radiation images.

To prevent stimulable phosphors from deterioration due to moisture sorption, there were proposed a method of reducing moisture reaching a stimulable phosphor layer by coating the phosphor layer with a moisture-resistant protective layer or moisture-resistant resin film, a method of using fine hydrophobic particles described in JP-B 62-177500 (hereinafter, the term, JP-B means a published Japanese Patent), a method of using silane coupling agents described in JP-B 62-209398, a method of using titanate type coupling agents described in JPB 2-278196, and a method of using silicone oil described in JP-B 5-52919. However, there has not yet been achieved a fundamental solution to the problems described above.

As is known, stimulabilty of a stimulable phosphor depends on its particle size, and JP-A 55-163500 teaches the preferred average particle size being 1 to 30 $\mu$m. JP-B 3-79680 also discloses the relationship between the phosphor particle size and characteristic values such as sensitivity, graininess and sharpness. JP-A 7-233369 discloses a means to control the stimulable phosphor particle size and form ina liquid phase process. Thus, contrary to the conventional preparation of a rare earth activated alkaline earth metal fluorohalide stimulable phosphor, in which raw materials of an alkaline earth metal fluoride, an alkaline earth metal halide other than the fluoride, a rare earth halide and ammonium fluoride are mixed in a dry process or are mixed while being dispersed in an aqueous medium and thereafter are calcined and ground, the rare earth activated alkaline earth metal fluorohalide stimulable phosphor is precipitated in an aqueous solution. According the above liquid phase process of precipitating the rare earth activated alkaline earth metal fluorohalide stimulable phosphor in an aqueous solution was obtained fine phosphor particles with homogeneous size with no deterioration of performance. However, as sensitivity is enhanced and the particle size decreases, problems such as deterioration due to moisture becomes evident. The deterioration starts as soon as calcined phosphor particles are exposed to air. To prevent this, it is contemplated to store the calcined phosphor particles in an atmosphere shielded from air. However, it is impractical to conduct all of the process of preparing the phosphor plate in such an atmosphere.

SUMMARY OF THE INVENTION

It is an object of the present invention to solve the above-described problems in a radiation image conversion panel using a stimulable phosphor and to provide a stimulable phosphor which can be used in acceptable conditions over a long period of time without deterioration in performance due to moisture sorption, a preparation method thereof, a radiation image conversion panel by the use of the stimulable phosphor and a preparation method thereof.

The above object of the invention can be accomplished by the following constitution:

1. a method for preparing a stimulable phosphor comprising the steps of:
   (1) forming a stimulable phosphor and
   (2) coating the formed stimulable phosphor with particles of a metal oxide, and a silane coupling agent or a metal alkoxide;

2. a method for preparing a stimulable phosphor comprising the steps of:
   (1) forming a stimulable phosphor precursor,
   (2) calcining the formed precursor in the presence of particles of a first metal oxide, and
   (3) coating the calcined precursor with a silane coupling agent or metal alkoxide;

3. a method for preparing a stimulable phosphor comprising the steps of:
   (1) forming a stimulable phosphor precursor,
   (2) calcining the formed precursor in the presence of a metal alkoxide, and
   (3) coating the calcined precursor with a silane coupling agent or metal alkoxide, and particles of a metal oxide;

4. a method for preparing a stimulable phosphor comprising the steps of:
   (1) forming a stimulable phosphor precursor,
   (2) calcining the formed precursor in the presence of a first metal alkoxide and particles of a first metal oxide, and
   (3) coating the calcined precursor with a silane coupling agent or a second metal alkoxide;

5. a method for preparing a radiation image conversion panel comprising the step of:
   forming a phosphor layer containing a stimulable phosphor prepared according to the method as described in 1;

6. a method for preparing a radiation image conversion panel comprising the step of:
   forming a phosphor layer containing a stimulable phosphor prepared according to the method as described in above 9.

7. a method for preparing a radiation image conversion panel comprising the step of:
   forming a phosphor layer containing a stimulable phosphor prepared according to the method as described in above 19;

8. A method for preparing a radiation image conversion panel comprising the step of:
   forming a phosphor layer containing a stimulable phosphor prepared according to the method as described in above 22.

Furthermore, preferred embodiments of the present invention include:

1. a method for preparing a radiation image conversion panel having a stimulable phosphor layer comprising a stimulable phosphor dispersed in a binder, the method comprising:
   coating particles of the stimulable phosphor with particles of a metal oxide and
   subjecting the particles of the stimulable phosphor to surface treatment using a silane coupling agent;

2. a radiation image conversion panel having a stimulable phosphor layer comprising a stimulable phosphor dispersed in a binder, wherein the stimulable phosphor layer comprises particles of the stimulable phosphor which have been coated with particles of a metal oxide and further subjected to surface treatment using a silane coupling agent;

3. the radiation image conversion panel described in 2, wherein the amount of the metal oxide particles is 0.05 to 10% by weight, based on the stimulable phosphor particles and the amount of the silane coupling agent is 0.1 to 5% by weight, based on the stimulable phosphor particles;

4. the radiation image conversion panel described in above 2 or 3, wherein the metal oxide particles is ones which have been subjected to a hydrophobicity-enhancing treatment;

5. the radiation image conversion panel described in any of above 2 to 4, wherein the metal oxide is one selected from the group consisting of silica, alumina and titanium oxide; and 6. the radiation image conversion panel described in any of above 1 to 5, wherein the silane coupling agent contains a mercapto group;

7. a moisture-proofing method of a rare earth activated alkaline earth metal fluoroiodide stimulable phosphor comprising:

calcining precursor particles of the rare earth activated alkaline earth metal fluoroiodide stimulable phosphor in the presence of first metal oxide particles with a particle size of 2 to 50 nm and then coating the calcined particles with a silane coupling agent, or calcining the precursor particles in the presence of the metal oxide and then coating the calcined particles with second metal oxide particles with a particle size of 2 to 50 nm and a silane coupling agent;

8. the moisture-proofing method described in above 7, wherein the rare earth activated alkaline earth metal fluoroiodide stimulable phosphor, which has been prepared in a liquid phase process, is represented by the following formula (1):

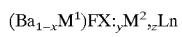

$(Ba_{1-x}M^1)FX_yM^2_zLn$ wherein $M^1$ represents a metal selected from the group consisting of Mg, Ca, Sr, Zn and Cd; $M^2$ represents an alkali metal selected from the group consisting of Li, Na, K, Rb and Cs; X represents a halogen selected from the group consisting of Cl, Br and I; Ln represents a rare earth element selected from the group consisting of Ce, Pr, Sm, Eu, Gd, Tb, Tm, Dy, Ho, Nd, Er and Yb; and x, y and z each represent $0 \leq x \leq 0.6$, $0 \leq y \leq 0.05$, $0 \leq z \leq 0.2$;

9. a rare earth activated alkaline earth metal fluoroiodide stimulable phosphor, wherein the stimulable phosphor is phosphor particles with a particle size of 1 to 10 μm and represented by formula (1) described above, and wherein precursor particles of the stimulable phosphor are coated with a first metal oxide particles with a size of 2 to 50 nm and then calcined, and after calcination, the precursor particle surface is subjected to a coating treatment using a silane coupling agent, or second metal oxide particles and a silane coupling agent;

10. the stimulable phosphor described in above 9, wherein the total amount of the first and second metal oxide particles is 0.01 to 10% by weight, based on the precursor particles and the amount of the silane coupling agent is 0.1 to 5% by weight, based on the precursor particles;

11. the stimulable phosphor described in above 9 and 10, wherein the silane coupling agent contains a mercapto group;

12. the stimulable phosphor described in above 9 and 10, wherein the silane coupling agent contains a vinyl group;

13. the stimulable phosphor described in above 10, wherein the first metal oxide particles are alumina;

14. the stimulable phosphor described in above 10, wherein the first metal oxide particles are silica;

15. a radiation image conversion panel having a phosphor layer comprising a stimulable phosphor, wherein the stimulable phosphor is the rare earth activated alkaline earth metal fluoroiodide stimulable phosphor described in above 9 to 14;

16. a moisture-proofing method of a rare earth activated alkaline earth metal fluoroiodide stimulable phosphor comprising:

calcining precursor particles of the rare earth activated alkaline earth metal fluoroiodide stimulable phosphor in the presence of first metal oxide particles with a particle size of 2 to 50 nm and then coating the calcined particle surface with a metal alkoxide of at least one of aluminum, zirconium, titanium, silicon and barium, or calcining the precursor particles in the presence of the metal oxide and then coating the calcined particle surface with second metal oxide particles with a particle size of 2 to 50 nm and a metal alkoxide of at least one of aluminum, zirconium, titanium, silicon and barium;

17. the moisture-proofing method described in above 16, wherein the rare earth activated alkaline earth metal fluoroiodide stimulable phosphor, which has been prepared in a liquid phase process, is represented by the formula (1) described above;

18. a rare earth activated alkaline earth metal fluoroiodide stimulable phosphor, wherein the stimulable phosphor is phosphor particles with a particle size of 1 to 10 μm and represented by formula (1) described above, and wherein the stimulable phosphor comprises:

precursor particles of the stimulable phosphor, a first metal oxide particles coated on the precursor particle surface, and a metal alkoxide of at least one of aluminum, zirconium, titanium, silicon and barium which is, after calcination, coated on the stimulable phosphor, or the metal alkoxide and second metal oxide particles;

19. the stimulable phosphor described in above 18, wherein the total amount of the first and second metal oxide particles is 0.01 to 10% by weight, based on the precursor particles and the amount of the metal alkoxide is 0.1 to 5% by weight, based on the precursor particles;

20. the stimulable phosphor described in above 18 and 19, wherein the metal alkoxide is aluminum alkoxide;

21. the stimulable phosphor described in 18 and 19, wherein the first metal oxide particles are alumina;

22. the stimulable phosphor described in 18 and 19, wherein the second metal oxide particles are silica;

23. a radiation image conversion panel comprising a rare earth activated alkaline earth metal fluorohalide stimulable phosphor described in 18 to 22.

DETAILED DESCRIPTION OF THE INVENTION

The stimulable phosphors used in the present invention include those described in afore-mentioned (1) to (14).

The stimulable phosphor particles used in the invention may take any form, including tabular particles, spherical particles, hexagonal particles and tetradecahedral particles.

In the course of studying deterioration in sensitivity due to moisture sorption of stimulable phosphors, it was found by the inventors of the present invention that deterioration in performance was caused by deliquescence of the phosphor due to moisture sorption and the resulting alteration of the phosphor.

This phenomenon tends to occur in stimulable phosphors containing a halogen atom. Examples of the stimulable phosphor containing a halogen atom include one which is represented by the following formula (1):

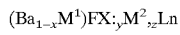

$(Ba_{1-x}M^1)FX:_yM^2,_zLn$ in which $M^1$ is a metal selected from the group consisting of Mg, Ca, Sr, Zn and Cd; $M^2$ is an alkali metal selected from the group consisting of Li, Na, K, Rb and Cs; X is a halogen selected from the group consisting of Cl, Br and I; Ln is a rare earth element selected from the group consisting of Ce, Pr, Sm, Eu, Gd, Tb, Tm, Dy, Ho, Nd, Er and Yb; and $0 \leq x \leq 0.6$, $0 \leq y \leq 0.05$, and $0 \leq z \leq 0.2$.

In the present invention, the stimulable phosphor precursor does not any stimulated emission or instantaneous emission. In cases of the precursor prepared through a liquid phase process, for example, the precursor is to be a compound represented by the above-described formula (1) in a state prior to being heated at a temperature of 600° C. or higher. In a solid phase process, the precursor is to be a raw material for the stimulable phosphor or its mixture, which is in a state prior to being heated at a temperature of 600° C. or higher.

Therefore, even if only either one of deliquescence and alteration is prevented, fundamental solution can not be achieved. As a result of studying prevention of both of the deliquescence and alteration, the object described above was found to be achieved by the constitution of the present invention. The deliquescence refers to phenomenon in which phosphor particles sorb atmospheric to form an aqueous solution by themselves, and the alteration refers to change in phosphor characteristics of the phosphor due to atmospheric moisture without deliquescing. Mechanism of the alteration is not clearly elucidated but the alteration is supposed to be concerned with structural changes in the interior of the phosphor particle. The present invention is effective for preventing both deliquescence and alteration and also effective in phosphor particles having no deliquescence property. Effects of the present invention reside in prevention of deliquescence or alteration of the phosphor.

Moisture sorption of the phosphor is supposed to occur by various causes including capillary condensation. Once the moisture is produced as a droplet among phosphor particles, deterioration in performance due to deliquescence occurs.

In the invention, the deliquescence can be prevented by the following method:
(1) coating the stimulable phosphor with a metal oxide, and a silane coupling agent or a metal alkoxide;
(2) coating with a silane coupling agent or a metal alkoxide after calcining a stimulable phosphor precursor in the presence of a first metal oxide, or coating with a silane coupling agent or metal alkoxide, and a second metal oxide after calcining a stimulable phosphor precursor in the presence of a first metal oxide;
(3) coating with a silane coupling agent or metal alkoxide, and a second metal oxide after calcining a stimulable phosphor precursor in the presence of a metal alkoxide;
(4) coating with a silane coupling agent or a metal alkoxide after calcining a stimulable phosphor precursor in the presence of a first metal oxide or a metal alkoxide; and
(5) coating with a silane coupling agent or metal alkoxide, and a second metal oxide after calcining a stimulable phosphor precursor in the presence of a first metal oxide or metal alkoxide. These methods will be further explained.

The method (1) will be further explained in detail.

It is contemplated that coating with fine metal oxide particles according to the invention is effective for preventing deliquescence. Specifically, fine metal oxide particles which have been subjected to treatment for increasing hydrophobicity, are markedly effective. Further, surface treatment using a silane coupling agent or a metal alkoxide, after coating with fine metal oxide particles, also provides effects similar to that of the fine metal oxide particles.

Although silane coupling agents were effective for preventing alteration, it was difficult to form a silicon-containing layer directly onto phosphor particles using a silane coupling agent.

In one embodiment of the invention, the phosphor particles are coated with second metal oxide particles and further subjected to surface treatment using a silane coupling agent. Thus, it is supposed that the silane coupling agent functions so effectively that spaces between metal oxide particles are filled with a silicon-containing layer of the silane coupling agent to form a continuous phase. It is effective that coating with the second metal oxide particles and surface treatment using a silane coupling agent or a metal alkoxide are conducted simultaneously or sequentially in this order.

The second metal oxide particles used in the invention are comprised of silica, alumina or titanium oxide and the particle size thereof is preferably 2 to 50 nm. The particles with a size of less than 2 nm are not industrially available.

In cases when the particle size exceeds 50 nm, it is rather difficult to sufficiently coat the surface of the phosphor particles. The metal oxide particles used in the invention include metal oxides such as silica, alumina or titanium dioxide produced through dry process (such as flame hydrolysis method or arc method) and further metal oxides produced wet process such as acid decomposition of a salt (e.g., sodium silicate) and hydrolysis of organogel. Treatments for enhancing hydrophobicity of the metal oxide particles include treatment using silane coupling agents such as methylchlorosilane, hexamethyldisilane and octyltrimethoxysilane, and treatment using silicone oil. Metal oxide particles which have been subjected to treatment for enhancing hydrophobicity, are also commercially available.

In the invention, hydrophobic metal oxide particles refers to those having not less than 20 of a degree of hydrophobicity (or MW value), based on the methanol wettability method.

To mix an appropriate amount of a metal oxide with phosphor particles with an average size of a few μms to scores of μms, any method known in the art is usable. The method in which phosphor particles are gradually added to the total amount of a metal oxide with mixing by use of a mixing apparatus such as Turbla Shaker Mixer (available form Shinmaru Enterprises Co.) and the method in which phosphor particles are stirred in a 0.5 to 10.0 wt % metal oxide-dispersing solution, filtered and dried are preferred in terms of uniform coating of particles.

Examples of silane coupling agent used in the invention include methyl trimethoxysilane, methyltriethoxysilane, vinyltriacetoxysilane, vinyltrichlorosilane, vinyltriethoxysilane, γ-chloropropyltrimethoxysilane, γ-chloropropylmethyldichlorosilane, γ-chloropropylmethyldimethoxysilane, γ-chloropropylmethyldiethoxysilane, γ-aminopropyltriethoxysilane, N-(β-amino)-γ-aminopropyltrimethoxysilane, N-(β-amino)-γ-aminopropylmethyldimethoxysilane, γ-mercaptopropyltrimethoxysilane, γ-mercaptopropylmethyldimethoxysilane, γ-glycidoxypropyltrimethoxysilane, γ-glycidoxypropylmethyldimethoxysilane, γ-methacryloxypropyltrimethoxysilane, γ-methacrylopropylmethyldimethoxysilane, γ-(2-aminoethyl)aminopropyltrimethoxysilane, γ-isocyanatopropyltriethoxysilane, γ-(2-aminoethyl) aminopropylmethyldimethoxysilane, γ-anilinopropyltrimethoxysilane, vinyltrimethoxysilane, N-β-(N-vinylbenzylaminoethyl)-γ-aminopropyltromethoxysilane-hydrochloride, and aminosilane complex compounds. Of these are preferred vinyl type, mercapto type, glycidoxy type, and methacryloxy type silanes, and the mercapto type silanes are more preferred.

Specifically preferred examples of the silane coupling agent include γ-mercaptopropyltrimethoxysilane:

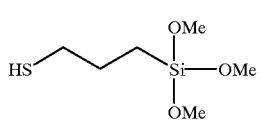

MW 196.3

Specific Gravity (25° C.) 1.05
Refraction Index (25° C.) 1.44
b.p. (°C.) 212

3-mercaptopropylmethyldimethoxysilane and mercaptopropyltriethoxysilane. Furthermore, compounds as effective as the mercapto type silane coupling agents include 1-mercaptomethyl1,1,3,3,3-pentamethyldisiloxane and 1-(3-mercaptopropyl)1,1,3,3,3-pentamethyldisiloxane. According to the study by the inventors of the present invention, it was proved that mercapto-containing compounds were effective in preventing discoloration and specifically preferred silane coupling agents and siloxanes described above were effective not only in moisture resistance bur also in preventing reduction of sensitivity due to coloration of a phosphor. Specifically, in cases of a phosphor containing an iodine atom, the mercaptocontaining compound is markedly effective in prevention of discoloration, preventing yellowing of the phosphor due to liberated iodide.

To allow the silane coupling agent or metal alkoxide to be adhered onto phosphor particles coated with metal oxide particles, any method known in the art is usable. Examples thereof include a dry processing method in which a silane coupling agent or a metal alkoxide is dropwise added or sprayed to phosphor particles with stirring by use of Hencyl mixer; a slurry method in which a silane coupling agent is dropwise added to phosphor particles in the form of slurry with stirring, and after completing addition, the phosphor is precipitated, filtered and dried to remove solvent; a method in which after dispersing a phosphor in a solvent and adding thereto a silane coupling agent or a metal alkoxide, the solvent is evaporated to form a adhered layer; and a method in which a silane coupling agent or a metal alkoxide is added to coating solution of a phosphor. Drying for the silane coupling agent or metal alkoxide is conducted preferably at 60 to 130° C. over a period of 10 to 200 min.

When coating with metal oxide particles and surface treatment using a silane coupling agent or a metal alkoxide are simultaneously conducted, the present invention are effectuated. Examples of such a conduct include a method in which phosphor particles immediately after being calcined are ground in a dispersion comprised of metal oxide particles, and a silane coupling agent or metal alkoxide, and coating the phosphor particles with the metal oxide particles and surface treatment using the silane coupling agent or metal alkoxide are performed simultaneously with grinding the phosphor particles, followed by being filtered and dried; and a method in which metal oxide particles, and a silane coupling agent or metal alkoxide are together added to a phosphor coating solution.

The metal oxide amount of more than 10%, based on the phosphor results in reduced sensitivity, the amount of less than 0.05% leading to reduced effectuation of the present invention. Further, the amount of a silane coupling agent or a metal alkoxide of more than 5%, based on the phosphor also results in reduced sensitivity and hardened coating layer, leading to crack; the amount of less than 0.1% leading to markedly reduced effectuation of the invention.

Herein, the metal alkoxide refers to a compound in which the hydrogen of a hydroxy group of an alcohol is replaced by a metal (M). Examples of the metal include aluminum, zirconium, titanium, silicon, and barium. Specifically, aluminum alkoxide is preferred in terms of prevention of discoloration and deliquescence of phosphors. Further, a metal alkoxide having a unsubstituted or substituted, lower alkyl group (e.g., ethyl, propyl, butyl, 2-methoxyethyl) is preferred in terms of easy handling, high hydrolyzablity and high reactivity at a lower temperature. Examples of aluminum alkoxide and its derivatives include aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, aluminum tris(hexyloxide), aluminum tris(2-ethylhexyloxide, aluminum tris(2-methoxyethoxide), aluminum tris(2-ethoxyethoxide), and aluminum tris(2-butoxyethoxide). Of these is preferred an aluminum alkoxide having a lower alkyl group, such as aluminum triethoxide, $(C_2H_5O)_3Al$ and aluminum triisopropoxide, $[(CH_3)_2CHO]_3Al$.

Next, the method (2) afore-mentioned will be further explained.

After coating uncalcined precursor particles with first metal oxide particles and subjecting them to calcination, the particles are further subjected a surface treatment using a silane coupling agent and thereby were obtained phosphor particles with enhanced moisture resistance.

It is supposed that phosphor particles and metal oxide particles are bonded with each other through electric force. so that when a force mere than the electric force acts onto the particles in the process of dispersing, solution making or coating, metal oxide particles peel off from phosphor particles. Thus, the use of a silane coupling agent in the method (2) prevent this peeling-off and moisture resistance-enhancing effects of the phosphor particles are further maintained even after subjected to the process of dispersion, solution making and coating.

The amount of the first metal oxide is determined within the range of providing no adverse effect on calcination efficiency, and calcined phosphor particles are further coated with a second metal oxide in an amount supplementing the insufficient amount of the first metal oxide and then subjected to surface treatment using a silane coupling agent, leading to advantageous effects of preventing deterioration in emission characteristics due to reduced calcination efficiency.

The reason that the metal oxide particles do not peel off from the phosphor particles in the process of dispersing, solution making and coating, has not been clarified, but it is assumed that after calcination, bonding is produced between phosphor and metal oxide particles.

The metal oxide and silane coupling agent used in (2) described above are the same as those used in (1). Further, the first metal oxide and the second metal oxide may be the same or different.

The first metal oxide is preferably alumina in terms of preventing sintering of phosphor particles, which is used preferably in an amount of 0.01 to 2.0% by weight, based on a phosphor precursor, in terms of calcination efficiency.

When alumina is used as a first metal oxide, the use of silica as a second metal oxide leads to enhanced moisture resistance. The reason thereof has not been clarified and it is contemplated that silica is different in charging property from alumina so that strong electric force acts between the silica and the alumina particles fixed on the surface of phosphor particles.

The size of metal oxide particles used in the invention is preferably from 2 to 50 nm. Particles of less than 2 nm are hardly available and it becomes difficult to closely coat, with particles of more than 50 nm, the surface of phosphor particles. The total metal oxide amount of not more than 10% based on the phosphor reduces a decrease of sensitivity and the total amount of not less than 0.01% enhances effects of the invention.

The metal oxide and metal alkoxide used in (2) described above are the same as those used in (1). Further, the first metal oxide and the second metal oxide may be the same or different.

The silane coupling agent amount of not more than 5% based on the phosphor reduced a decrease of sensitivity and prevents cracking of a coating layer due to hardening thereof; and the amount of not less than 0.1% enhances effects of the invention.

Next, the metal alkoxide used in the method (2) will be further described. It was found by the inventors of the present invention that after coating phosphor particles with metal oxide particles, surface treatment with a metal alkoxide prevented deliquescence or alteration of a phosphor. Specifically, this effect was marked in the use of aluminum triisopropoxide.

There is known a technique of providing water-proofing capability by treating powdery inorganic material with a metal alkoxide. According to the test results by the inventors of the present invention, it was proved that it was difficult to form an oxide layer using a metal oxide, directly on the surface of a stimulable phosphor particles represented by the formula (1), $(Ba_{1-x}M^1)FX{:}_yM^2_zLn$.

In one embodiment of the invention, the phosphor particles are coated with second metal oxide particles and further subjected to surface treatment using a silane coupling agent. It is supposed that after coating treatment with a metal oxide, when subjecting to surface treatment using a metal alkoxide, the metal alkoxide functions so effectively that spaces between metal oxide particles are filled with an oxide layer of the metal alkoxide to form a continuous phase.

After coating uncalcined precursor particles with first metal oxide particles and subjecting them to calcination, the particles are further subjected a surface treatment using a metal alkoxide and thereby were obtained phosphor particles with enhanced moisture resistance.

It is supposed that phosphor particles and metal oxide particles are bonded with each other through electric force. so that when a force mere than the electric force acts onto the particles in the process of dispersing, solution making or coating, metal oxide particles peel off from phosphor particles. Thus, the use of a metal alkoxide in the method (2) prevent this peeling-off and moisture resistance-enhancing effects of the phosphor particles are further maintained even after subjected to the process of dispersion, solution making and coating.

The amount of the first metal oxide is determined within the range of providing no adverse effect on calcination efficiency, and calcined phosphor particles are further coated with a second metal oxide in an amount supplementing the insufficient amount of the first metal oxide and then subjected to surface treatment using a silane coupling agent, leading to advantageous effects of preventing deterioration in emission characteristics due to reduced calcination efficiency.

The reason that the metal oxide particles do not peel off from the phosphor particles in the process of dispersing, solution making and coating, has not been clarified, but it is assumed that after calcination, bonding is produced between phosphor and metal oxide particles.

The first metal oxide is preferably alumina in terms of preventing sintering of phosphor particles, which is used preferably in an amount of 0.01 to 2.0% by weight, based on a phosphor precursor, in terms of calcination efficiency.

When alumina is used as a first metal oxide, the use of silica as a second metal oxide leads to enhanced moisture resistance. The reason thereof has not been clarified and it is contemplated that silica is different in charging property from alumina so that strong electric force acts between the silica and the alumina particles fixed on the surface of phosphor particles.

The size of metal oxide particles used in the invention is preferably from 2 to 50 nm. Particles of less than 2 nm are hardly available and it becomes difficult to closely coat, with particles of more than 50 nm, the surface of phosphor particles. The total metal oxide amount of not more than 10% based on the phosphor reduces a decrease of sensitivity and the total amount of not less than 0.01% enhances effects of the invention. The metal alkoxide amount of not more than 5% based on the phosphor reduced a decrease of sensitivity and prevents cracking of a coating layer due to hardening thereof; and the amount of not less than 0.1% enhances effects of the invention.

Next, methods (3), (4) and (5) will be further explained. The method for allowing a metal alkoxide to adhere to a phosphor precursor particles, include immersion of the precursor in an organic solvent solution containing the metal alkoxide and spraying the solution. Immersion of the precursor is preferred in terms of uniformity on the precursor surface. In this case, the phosphor precursor is immersed in a 0.01 to 5% by weight alkoxide organic solvent solution, based on the phosphor precursor of a metal alkoxide, over a period of 10 to 100 hrs. with stirring and it is then filtered to obtain the alkoxide-adhered phosphor precursor. Thereafter, the precursor is calcined to obtain phosphor particles. The thus obtained phosphor does not exhibit enhanced moisture-resistance. The calcined phosphor particles are further subjected to surface-treatment using metal oxide particles, and a metal alkoxide or silane coupling agent. The resulting phosphor particles proved to provide only a little reduction of moisture-resistance due to releasing the surface-treating agent during the process of dispersion, solution-making and coating, as compared to phosphor particles which have been calcined without metal alkoxide-adhering and subjected to surface-treatment using metal oxide particles, and a metal alkoxide or silane coupling agent. Although it is not definitely clarified why the phosphor particles calcined in the presence of a metal alkoxide provides little reduction of moisture-resistance, it is presumed that the oxide coating on the phosphor surface is strengthened by treatment with a metal oxide, and a metal alkoxide or silane coupling agent.

Further, after allowing a first metal oxide and a metal alkoxide to adhere onto the phosphor precursor, the precursor is calcined and treated with a metal alkoxide or silane coupling agent. The resulting phosphor particles exhibit no reduced moisture-resistance due to releasing the surface-treating agent during the process of dispersion, solution-making and coating. It is supposed that when metal oxide particles and a metal alkoxide adhere onto the phosphor precursor particles, the oxide coating of the metal alkoxide functions so effectively that spaces between metal oxide particles are filled with an oxide layer of the metal alkoxide to form a continuous phase, and that the metal oxide particles are fixed to the phosphor particles through calcination, and the surface treating agent becomes more resistant to release against external forces.

The method for allowing metal oxide particles and a metal alkoxide to adhere onto the phosphor precursor particles include immersion of the precursor in an alkoxide organic solvent solution containing a metal oxide particle dispersion; a method in which metal oxide particles are added to phosphor precursor particles, and after allowing the metal oxide particles to adhere onto the precursor particles with stirring in a mixer, the precursor particles are immersed in an alkoxide organic solvent solution; and spraying of an alkoxide organic solvent solution.

An increased amount of metal oxide particles or metal alkoxide to be adhered to the precursor sometimes results in reduced calcination efficiency or reduced sensitivity of the resulting phosphor. In such cases, the metal alkoxide or metal oxide is adjusted to fill within the range to cause no reduction in the calcination efficiency and sensitivity, and after calcination, the phosphor with a desired moisture-resistance and sensitivity can be obtained by treating it with the second metal oxide particles, and a metal alkoxide or silane coupling agent.

The metal alkoxide which adheres to the phosphor precursor is preferably aluminum alkoxide in terms of sensitivity and anti-sintering of the phosphor, and is preferably 0.01 to 2.0% by weight, based on the phosphor precursor, in terms of calcination efficiency. The first metal oxide to be adhered to the phosphor precursor is preferably alumina from the same view point and the total amount of the metal alkoxide and the first metal oxide is preferably 0.01 to 2.0% by weight, based on the phosphor precursor. The total amount of the first metal oxide adhered to the phosphor precursor and the second metal oxide to be added after calcination of more than 10%, based on the phosphor results in reduced filling ratio of the coated layer, leading to reduced sensitivity. On the other hand, the total amount of less than 0,01% leads to markedly reduced effects of the invention. The total amount of the metal alkoxide and the silane coupling agent of more than 5% causes cracking of the coated layer and reduction of sensitivity and the amount of less than 0.1% leads to markedly reduced effects of the invention.

Herein, the metal alkoxide refers to a compound in which the hydrogen of a hydroxy group of an alcohol is replaced by a metal (M). Examples of the metal include aluminum, zirconium, titanium, silicon, and barium. Specifically, aluminum alkoxide is preferred in terms of prevention of discoloration and deliquescence of phosphors. Further, a metal alkoxide having a unsubstituted or substituted, lower alkyl group (e.g., ethyl, propyl, butyl, 2-methoxyethyl) is preferred in terms of easy handling, high hydrolyzablity and high reactivity at a lower temperature. Examples of aluminum alkoxide and its derivatives include aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, aluminum tris(hexyloxide), aluminum tris(2-ethylhexyloxide, aluminum tris(2-methoxyethoxide), aluminum tris(ethoxyethoxide), and aluminum tris(2-buxyethoxide). Of these is preferred an aluminum alkoxide having a lower alkyl group, such as aluminum triethoxide and aluminum triisopropoxide.

The first metal oxide is preferably alumina. When alumina is used as the first metal oxide, the second metal oxide is preferably silica. The use of silica as the second metal oxide enhances moisture-resistance. The reason thereof has not been clarified and it is contemplated that silica is different in charging property from alumina so that strong electric force acts between the silica and the alumina particles fixed on the surface of phosphor particles. The particle size of the metal oxide is preferably 2 to 50 nm.

The second metal oxide particles is preferably those which have been subjected to hydrophobicity-enhancing treatment, in terms of prevention of deliquescence of phosphor particles. Examples of the hydrophobicity-enhancing treatment include treatment using a silane coupling agent having tendency of enhancing water repellent, such as vinyl triethoxysilane, γ-glycidoxypropyltrimethoxysilane, methyltrimethoxysilane, n-hexyltriethoxysilane, dimethylchlorosilane, hexamethyldisilane, and octyltrimethoxysilane; and a treatment with silicone oil. Metal oxide particles which have been subjected to the hydrophobicity-enhancing treatment, are also commercially available. After surface-treated with a metal oxide, phosphor particles may be further treated with a silane coupling agent or a mercapto type silane coupling agent effective in prevention of discoloration. The resulting phosphor particles exhibit effects similar to the case of using metal oxide particles which have been subjected to the hydrophobicity-enhancing treatment. It is preferred that metal oxide particles which have been subjected to the hydrophobicity-enhancing treatment using dimethylchlorosilane, hexamethyldisilane or octyltrimethoxysilane, are used as the second metal oxide particles and after calcination, a mercapto-type silane coupling agent is used. In this case, preferred mercapto-type silane coupling agent include γ mercaptopropyltrimethoxysilane, 3-mercaptopropylmethyldimethoxysilane and mercaptopropyltriethoxysilane.

Next, rare earth activated alkaline earth metal fluoroiodie (halide) stimulable phosphors which are prepared by a liquid phase process and represented by the formula (1) aforedescribed, will be further explained.

The rare earth activated alkaline earth metal fluoroiodide stimulable phosphor was prepared not through a solid phase process in which it is difficult to control the particle form, but through a liquid phase process in which the particle size can be readily controlled. It is preferred to prepare the stimulable phosphor according to the following liquid phase preparation methods.

Preparing Method 1:

The method comprises the steps of preparing within a reaction vessel an aqueous mother liquor containing at least 1 mol/l (preferably at least 1.35 mol/l and more preferably 3.0 to 4.5 mol/l) $BaX_2$ ($BaI_2$, $BaBr_2$ except for a fluoride) and a halide of Ln, provided that when x of the formula (1) is not zero, the mother liquor further contains a halide of $M^1$ and when y is not zero, the mother liquor further contains a halide of $M^2$, adding an aqueous solution containing a at least 5 mol/l (preferably, at least 8 mol/l and more preferably 10 to 13 mol/l) inorganic fluoride (preferably, ammonium fluoride or alkaline metal fluoride) into the mother liquor, while maintaining the mother liquor at 50° C. or more (preferably, 80° C. or more) to form a crystalline precipitate of a precursor of the rare earth activated alkaline earth metal fluoroiodide stimulable phosphor, separating the crystalline precipitate of the precursor from the mother liquor, and calcining the separated precipitate while avoiding sintering of the precipitate, to form the stimulable phosphor. Herein, the expression, "avoiding sintering of the precipitate" means to avoid fusing of precipitated particles of the phosphor precursor during calcination.

Preparing Method 2:

The method comprises the steps of (a) preparing within a reaction vessel an aqueous mother liquor containing an at least 3 mol/l (preferably, at least 4 mol/l) $BaX_2$ ($BaI_2$, $BaBr_2$ except for a fluoride) and a halide of Ln, provided that when x of the formula (1) is not zero, the mother liquor further contains a halide of $M^1$ and when y is not zero, the mother liquor further contains a halide of $M^2$, (b) adding continuously or intermittently an aqueous solution containing an at least 5 mol/l (preferably at least 8 mol/l, and more preferably 10 to 13 mol/l) inorganic fluoride (preferably, ammonium fluoride or alkaline metal fluoride) and an aqueous solution containing $BaI_2$ to the mother liquor, while maintaining a temperature of at least 50° C. (preferably, at least 80° C.) and keeping constant a molar ratio of fluorine of the fluoride solution to barium of the $BaI_2$ solution, to form a crystalline precipitate of a precursor of the rare earth activated alkaline earth metal fluoroiodide stimulable phosphor, (c) separating the precipitate of the precursor from the mother liquor, and (d) calcining the separated precipitate while avoiding sintering of the precipitate.

The halide of Ln can be added at any time during the course of forming the precipitate. Thus, the halide may be added to a reaction mother liquor prior to the start of reaction, at the time of adding an aqueous solution of the inorganic fluoride (preferably ammonium fluoride or alkaline metal fluoride), or at the time of or after adding the inorganic fluoride aqueous solution and an aqueous solution of $BaX_2$ ($BaI_2$, $BaBr_2$ except for a fluoride).

An average particle size in the invention is an average value of sphere equivalent diameters of 200 particles which are selected at random from the electrocardiograph. Herein, the sphere equivalent diameter is referred to as a diameter of a sphere having a volume equivalent to that of the particle. Particles (crystals) relating to the invention are preferably monodisperse, and distribution of the average particle size (i.e., a coefficient of variation of the particle size) is 20% or less and preferably 15% or less.

The preparing method 1 of the stimulable phosphor is further explained in detail, as below.

Preparation of a precipitate of precursor crystals and preparation of stimulable phosphor:

At first, material(s) except for a fluoride compound are dissolved in an aqueous medium. Thus, $BaX_2$ ($BaI_2$, $BaBr_2$ except for a fluoride) and a halide of Ln (and if necessary, a halide of $M^2$ or $M^1$) are each added into an aqueous solvent and mixedly dissolved to prepare an aqueous solution. In this case, amounts of $BaX_2$ ($BaI_2$, $BaBr_2$ except for a fluoride) and the aqueous solvent are previously adjusted so as to have a concentration of $BaX_2$ ($BaI_2$, $BaBr_2$ except for a fluoride) of 1 mol/l or more. A small amount of acid, ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkaline metal fluoride was introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by the formula (1).

The resulting crystal of the phosphor precursor are separated from the solution through filtration or centrifugation, washed sufficiently with liquid such as methanol and dried. Further, the phosphor precursor crystals are charged into a heat-resistant vessel such as silica port, alumina crucible or silica crucible and then placed in a central portion of an electric furnace to be calcined without causing the crystals to sinter. The crystals are calcined at a temperature of 400 to 1300° C. and preferably 500 to 1000° C. The calcination time is dependent on the charging amount of a raw material mixture of the phosphor, the calcination temperature and a temperature at the time of being taken out from the furnace, and preferably 0.5 to 12 hrs.

Calcination is carried out in an atmosphere, e.g., in a neutral atmosphere such as nitrogen gas atmosphere, argon gas atmosphere or nitrogen gas atmosphere containing a small amount of hydrogen gas, weakly reducing atmosphere such as carbon dioxide atmosphere containing a small amount of carbon mono-oxide, or an atmosphere in which a small amount of oxygen is introduced.

Thus, according to the above-described calcination, an objective stimulable phosphor of a rare earth activated alkaline earth metal fluorohalide can be obtained.

The method (2) will be further explained more in detail.

At first, material(s) except for a fluoride compound and $BaX_2$ are dissolved in an aqueous medium. Thus, $BaX_2$ ($BaI_1$, $BaBr_2$ except for a fluoride) and a halide of Ln (and if necessary, a halide of $M^2$ or $M^1$) are each added into an aqueous solvent and mixedly dissolved to prepare an aqueous solution. In this case, amounts of the ammonium halide and the aqueous solvent are previously adjusted so as to have a concentration of the ammonium halide of 1 mol/l or more. A small amount of acid, an inorganic halide (e.g., ammonium salt, potassium salt, sodium salt, etc.,) ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkaline metal fluoride and an aqueous solution of $BaX_2$ were simultaneously introduced continuously or intermittently through a pipe provided with a pump, with adjusting so as to keep constant the ratio of the fluoride to $BaX_2$. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by the formula (1).

Subsequently, the resulting crystals of the phosphor precursor are separated from the solvent, dried and subjected to calcination in a manner similar to the method 1 to obtain an objective stimulable phosphor of a rare earth activated alkaline earth metal fluoroiodide.

Preparation of Panel:

As supports used in the radiation image converting panel according to the invention are employed a various types of polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide coating layer.

A thickness of the support depends on properties of the material, and is generally 80 to 1000 $\mu$m and preferably 80 to 500 $\mu$m in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butylate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

The binder is employed in an amount of 0.01 to 1 part by weight per 1 part by weight of the stimulable phosphor. A smaller amount of the binder is preferred in terms of sensitivity and sharpness of the radiation image converting panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image converting panel, the kind of the phosphor and an addition amount of the epoxy group-containing compound. Examples of solvents used for preparing the coating solution include lower alcohols such as methanol, ethanols, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

Examples of solvents used for preparing a coating solution of a stimulable phosphor layer include lower alcohols such as methanol, ethanol, isopropanol and n-butanol; ketones such as acetone, methyl ethyl ketone, methyl isobutyl ketone and cyclohexanone; esters of a lower fatty acid and lower alcohol such as methyl acetate, ethyl acetate and butyl acetate; ethers such as dioxane, ethylene glycol ethyl ether and ethylene glycol monomethyl ether; aromatic compounds such as tolyol and xylol; halogenated hydrocarbons such as methylene chloride and ethylene chloride; and a mixture thereof.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. A thickness of the stimulable phosphor layer of the radiation image converting panel depends on characteristics of the converting panel, the kind of the stimulable phosphor and a mixing ratio of the binder to the stimulable phosphor, and is generally 20 $\mu$m to 1000 $\mu$m and preferably 20 to 500 $\mu$m.

A phosphor sheet comprising a support having thereon is cut to a give size. Any means for cutting is applicable but a trimming cutter and a punching machine are desirable in terms of working efficiency and precision. Phosphor sheets cut to a given size are generally sealed with a moisture-proofing protective film. Examples of a sealing method include a method in which the phosphor sheet is laminated between moisture-proofing protective films and peripheral portions thereof are heat-sealed by a impulse sealer and a laminating method of pressing between two heated rollers. In the heat-sealing method using a impulse sealer, heat-sealing is preferably conducted under reduced pressure, in terms of preventing displacement of the phosphor sheet in the moisture-proofing film or removing atmospheric moisture.

Preferred embodiments of the radiation image conversion panel according to the invention include:

1. a radiation image conversion panel comprising a phosphor sheet having a stimulable phosphor layer provided on a support and a moisture-proofing film provided thereon so as to cover the phosphor layer side of the phosphor sheet, wherein the moisture-proofing film is a laminated film in which plural resin films including a metal oxide-deposited resin film are layeredly adhered, the laminated film having plural adhesive layers and the adhesive layers not containing a hardenable adhesive layer with a thickness of not more than 2.5 µm;
2. the radiation image conversion panel described in 1 above, wherein the outermost resin layer of the moisture-proofing film of the side in contact with the phosphor sheet is comprised of a heat-adhesive resin, the heat-adhesive resin layer containing 0.01 to 1.0% by weight of fine inorganic particles; and
3. the radiation image conversion panel described in 1 or 2 above, wherein the moisture-proofing film is provided on the upper and lower sides of the phosphor sheet so that the moisture-proofing film coats the entire surface of the phosphor sheet and is substantially not adhered to the phosphor layer, the periphery of the moisture-proofing film being set outside the periphery of the phosphor sheet, and that a moisture-proofing film on the support-side is one which is laminated with an aluminum film.

The above embodiments will be further explained. When a laminated film in which plural resin films, including a metal oxide-deposited resin film, are layeredly adhered, is used as a moisture-proofing film provided on the phosphor-side, light and shade (uneven density), other than the radiation image of the object due to the laminated film, is produced in reproduced images obtained from a radiation image conversion panel. As light source for exciting the stimulable phosphor plate are generally employed highly beam-convergent laser lights, and in cases when the laser light is employed, such an image defect as described above tends to occur.

It was found by the inventors of the present invention that when a laminated film in which plural resin films including a metal oxide-deposited resin film are layeredly adhered is used as a moisture-proofing film provided on the phosphor-side, plural hardenable adhesive layers included in the laminated film were associated with the uneven density produced in reproduced images. For example, it was shown that a laminated film prepared by a co-extruding lamination process did not produce any uneven density, irrespective of the number of laminated layers. It was further found that when a hardenable adhesive layer having a thickness of more than 2.5 µm was employed, no uneven density resulted.

It has not been definitely clarified why a hardenable adhesive layer of not more than 2.5 µm in thickness produced uneven density. It is presumed to be associated with nonuniform volume variation in hardening of an adhesive due to uneven and nonuniform coating, light refraction due to fine surface roughness (undulation) produced on the surface of resin films on both sides of a adhesive layer which is the result of differences in thermal expansion property between the resin film and the adhesive layer at the time of thermal treatment for hardening, and it is also associated with light interference in light of the thickness being a few times the wavelengths of the exciting light and stimulated emission.

The hardenable adhesive layer refers to one accompanying a cross-linking reaction with heat or UV rays. Examples thereof include two liquid-reaction type adhesives in which a main agent and a hardening agent are mixed, and one-liquid type adhesives such as vinyl type, acryl type, polyamide type, epoxy type, rubber type and urethane type adhesives. These are generally often used in a dry lamination process. However, hot melt type adhesives except for a time-hardening type adhesive are not included in the hardenable adhesives used the invention.

In sealing the phosphor sheet with the laminated film used in the invention, when the outermost resin layer of the moisture-proofing film of the side in contact with the phosphor sheet is a heat adhesive resin layer, the moisture-proofing film becomes heat-adhesive, enhancing efficiency in sealing the phosphor sheet.

It was also found by the inventors that periodical unevenness of the image density, which was different from uneven density due to the adhesive layer between resin films, occurred in sealing the phosphor sheet by heat adhesion. This uneven image density is unacceptable as a reproduced image used for medical examination, and was found to be due to the interface between the phosphor surface and the heat-adhesive resin layer arranged as the lowest layer of the moisture-proofing film. Such unevenness occurs when the phosphor surface is adhered to the moisture-proofing protective film and even in a state of being substantially not adhered. Herein the state of being substantially not adhered refers to the state in which the phosphor surface and the moisture-proofing film are not optically uniform. Further, the heat-adhesive film refers to a resin film capable of being heat-adhered by a generally used impulse sealer. Examples of such a resin film include copolymer of ethylene and vinyl acetate (EVA), polypropylene (PP) and polyethylene (PE) films.

It was further found that periodic uneven image density can be prevented by allowing fine inorganic particles such as silica, titanium and zeolite, in an amount of 0.01 to 1.0% by weight, to be incorporated in the heat-adhesive resin layer. A content of less than 0.01% by weight has no effect and a content of more than 1.0% by weight causes deterioration in transparency or a haze in the laminated protective film. Although it has not been clarified why addition of the fine inorganic particles results in uneven image density due to the interface between the resin layer and the phosphor surface, it is presumed to be due to the fact that incorporating fine inorganic particles with a high refraction index in the resin layer, results in a change of light refraction in the resin layer.

In radiation image conversion panels, a moisture-proofing protective film is provided on each of both sides of the phosphor sheet, taking a sealing structure in which the periphery of the upper moisture-proofing film is adhered to that of the lower film on the outer edge of the phosphor sheet, and thereby preventing ambient moisture from permeating from onto the sheet. The moisture-proofing film is preferably laminated with an aluminum film on the support-side, thereby further reducing moisture permeability.

The outermost heat-adhesive layer of the moisture-proofing film of the side in contact with the phosphor surface may be adhered onto the phosphor surface, or alternatively, the outermost layer may be substantially not adhered onto the phosphor surface. However, it is difficult to allow the resin layer to heat-adhere onto the phosphor layer which is heterogeneous to the resin layer, and unevenness produced in the adhesion state produces new image defects so that it is preferred to have the resin layer and the phosphor layer substantially not adhere to each other. The expression "substantially not adhere" means the state in which the surface of the phosphor layer and the moisture-proofing film are not optimally uniform. Thus, even if the phosphor surface and the moisture-proofing film are microscopically in point-contact with each other, the phosphor surface and the moisture-proofing film are in the state in which each is treated as a discontinuous body. Concretely, it is the state of the point-contact area being less than 5% of the phosphor surface area.

In the radiation image conversion panel used in the invention, when the thickness of the moisture-proofing film exceeds 300 μm, handling characteristics in sealing work of the film get worse and heat-adhesion using an impulse sealer becomes difficult. Accordingly, the thickness is preferably not more than 300 μm.

A vapor-deposited film, in which an inorganic oxide such as silica or alumina is deposited to enhance moisture-proofing, are low-priced and superior in processability and transparency, whose moisture resistance and oxygen permeability are barely affected by temperature and humidity so that this film is suited as a moisture-proofing protective film used in a stimulable phosphor plate for medical use, in which stable image quality can be obtained under any environment. However, vapor-deposited films proved to be inferior in moisture-resistance to polytrifluorochloroethylene films which have been conventionally used in sealing for a phosphor, so that multi-layered films were employed. When this multi-layered film was used as a protective film for the radiation image conversion panel, a fine uneven density resulted in reproduced images and were unacceptable as images used for medical diagnosis. However, according to the embodiments afore-mentioned, the vapor-deposited films became usable as a moisture-proofing film. To meet requirements for moisture-proofing, plural vapor-deposited films may be laminated. As a laminating method, a dry-laminating method is superior in terms of working property. In this method were generally used hardenable adhesive layers of 1.0 to 2.5 μm in thickness. In the present invention, however, the thickness of the adhesive layer needs to be more than 2.5 μmm. It is preferred to adjust the coating amount of the adhesive so as to have a dry layer thickness of 3 to 5 μm. When the coating amount was excessive, tunneling, bleeding-out or reticulation occurred.

A hot-melt lamination method, an extruding lamination method or a co-extruding lamination method can be employed to laminate resin films and these methods may be employed in combination with the dry-lamination process. In the hot-melt lamination method, an adhesive is melted and coated on the substrate to form an adhesive layer, the thickness of which can be set within the range of 1 to 50 μm. Used as a base resin of conventionally used hot-melt adhesives are EVA, EEA, polyethylene and butyl rubber. There may be added rosin, xylene resin terpene resin or styrene resin as a thickener; and wax as a plasticizer. In the extruding lamination method, resin melted at a high temperature is coated through dies onto the substrate and the thickness of which can be set to be within the range of 10 to 50 μm. Resins used in the extruding lamination include LDPE (low density polyethylene), EVA and PP. An adhesion-accelerating agent may be added to enhance adhesion to the substrate. Examples of adhesion-accelerating agents include organic titanium types, polyethylene imine types, isocyanate types and polyester types. The adhesion-accelerating agent is generally used for finely roughening the substrate surface to thereby accelerate spreading of melted polymer. In the coextruding lamination method, the same or different polymers are extruded through two or more extruding machines and laminated inside or outside a specifically designed die to simultaneously perform film-making and lamination. Resins used in the co-extruding lamination include LDPE, Ny (nylon), ION (ionomer), PP, EVA, HDPE (high density polyethylene), MDPE (medium density polyethylene), PVDC (polyvinyl vinylidene) and POL (polyolefin).

The moisture-proofing protective film of the support-side may be optically opaque and is preferably an aluminum-laminated film to enhance moisture-resistance. The aluminum foil is desirably one which has a thickness of not less than 9 μm in terms of deterioration in moisture-proofing due to pin holes. The thickness of the moisture-proofing film of the support-side is preferably not less than 300 μm.

EXAMPLES

The present invention will be further explained based on examples.

Example 1

The reaction vessel was charged with 2500 ml of $BaI_2$ aqueous solution (1.75 mol/l) and 125 ml of $EuBr_3$ aqueous solution (0.067 mol/l). Reaction mother liquor in the reaction vessel was maintained at a temperature of 83° C. with stirring, and thereto was added 250 ml of an aqueous solution of ammonium fluoride (8 mol/l) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. The crystals were charged into a silica boat and calcined at 850° C. for 2 hrs. in an atmosphere of hydrogen gas, using a tube furnace to obtain europium activated barium fluoroiodide phosphor particles.

The resulting phosphor particles were immersed in a ethanol solution containing metal oxide particles or a silane coupling agent as shown in Table 1 to form a slurry, ground in a mortar and dried at 80° C. for 3 hrs. In the Table, values in parentheses indicate the percentage of the metal oxide or silane coupling agent, based on the phosphor. The particles were subjected to classification to obtain particles with an average size of 7 μm. The used metal oxide particles and the silane coupling agent were as follows.

Metal Oxide Particles
- A1: Silica particles with an average size of 12 nm
- A2: Silica particles with an average size of 12 nm which were subjected to a hydrophobicity-enhancing treatment (produced by Japan Aerozyl Co., octylsilane-treated product)
- A3: Alumina particles with an average size of 13 nm
- A4: Titanium dioxide with an average size of 21 nm
  Silane coupling agent
- B1: γ-mercaptopropyltrimethoxysilane
- B2: γ-mercaptopropylmethyldimethoxysilane
- B3: Vinyltriethoxysilane
- B4: γ-glycidoxypropyltrimethoxysilane
- B5: n-hexyltriethoxysilane
- B6: γ-isocyanatopropyltrimethoxysilane
- B7: methyltrimethoxysilane Radiation image converting panels were prepared in the following manner. The prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a thickness of 230 μm. The resulting coated samples each were cut to a square of 10 cm×10 cm to prepare phosphor plates.

Example 2

The reaction vessel was charged with 2850 ml of BaI₂ aqueous solution (4.0 mol/l), 90 ml of EuI₃ aqueous solution (0.2 mol/l) and 60 ml of water. Reaction mother liquor in the reaction vessel was maintained at a temperature of 83° C. with stirring, and thereto was added 720 ml of a HF aqueous solution (5.0 mol/l) by using a roller pump to form precipitates. Thereafter, the reaction mixture was further kept at the temperature for 2 hr. with stirring to ripen the precipitates. The precipitates were filtered, washed with isopropanol and dried in vacuo to obtain crystals of a phosphor precursor of europium activated barium fluoroiodide. From scanning-type electronmicroscopic observation, the precipitates were proved to be comprised of tetradecahadral crystals. Using these crystals, phosphor plates were prepared in a manner similar to Example 1, according to Table 2, in which values in parentheses indicate the percentage by weight of the metal oxide or silane coupling agent, based on the phosphor. Metal oxide particles or silane coupling agents used were as below (and also as shown in Table 2).

Metal Oxide Particles

A2: Silica particles with an average size of 12 nm which were subjected to a hydrophobicity-enhancing treatment (produced by Japan Aerozyl Co., octylsilane-treated product)

Silane Coupling Agent

B1: γ-mercaptopropyltrimethoxysilane
B2: γ-mercaptopropylmethyldimethoxysilane

Evaluation of Moisture Resistance

Prepared samples were allowed to stand for 4 days under environment of 30° C. and 80% R.H. The ratio of sensitivity of a fresh sample (i.e., initial sensitivity) to that of an aged sample was determined for each sample. In this case, the closer to 1 the value, the less deterioration of sensitivity and the values in the Table each indicate an average of ten samples for each phosphor plate.

With respect to sensitivity, the phosphor plate was exposed to X-rays at 80 KVp and then excited by the light of a He-Ne laser (633 nm). Then, the stimulated emission emitted from the phosphor layer was detected by a detector (photomultiplier with spectral sensitivity of S-5) to measure an intensity of the emission. The initial sensitivities in the Table were shown as a relative value, based the sensitivity of Comparative example 1 being 1, in which phosphor particles were not treated with a metal oxide or a silane coupling agent.

As can be seen from the Tables, there were obtained phosphor plates exhibiting little deterioration of sensitivity due to moisture sorption, according to the present invention.

Coating with metal oxide particles exhibited tendency of enhancing the initial sensitivity. It is presumed that the metal oxide particles protected phosphor particles from damage such as crushing, dispersing and coating. Tendency of enhancing the initial sensitivity was marked in the use of metal oxide particles which were subjected the hydrophobicity-enhancing treatment. Prevention of sensitivity deterioration was further enhanced by use of the metal oxide particles subjected to the hydrophobicity-enhancing treatment and the mercapto-containing silane coupling agent.

TABLE 1

| | Metal Oxide (%)* | Silane Coupling Agent (%)* | Initial Sensitivity | Moisture Resistance | Remark |
|---|---|---|---|---|---|
| Comp. 1 | — | — | 1.0 | 0 | Discl**, Deli*** |
| Comp. 2 | A1(1.0) | — | 1.20 | 0 | Discl |
| Comp. 3 | A2(1.0) | — | 1.32 | 0 | Discl |
| Comp. 4 | A3(1.0) | — | 1.24 | 0 | Discl |
| Comp. 5 | — | B1(1.0) | 0.98 | 0 | Deli |
| Comp. 6 | — | B2(1.0) | 0.97 | 0 | Deli |
| Comp. 7 | — | B3(1.0) | 0.97 | 0 | Deli |
| Inv. 1 | A3(0.02) | B1(1.0) | 1.0 | 0.32 | |
| Inv. 2 | A3(0.05) | B1(1.0) | 1.10 | 0.80 | |
| Inv. 3 | A3(1.0) | B1(1.0) | 1.24 | 0.86 | |
| Inv. 4 | A3(5.0) | B1(1.0) | 1.19 | 0.89 | |
| Inv. 5 | A3(10.0) | B1(1.0) | 1.08 | 0.90 | |
| Inv. 6 | A3(15.0) | B1(1.0) | 0.71 | 0.92 | |
| Inv. 7 | A3(1.0) | B1(0.05) | 1.20 | 0.28 | |
| Inv. 8 | A3(1.0) | B1(0.1) | 1.20 | 0.78 | |
| Inv. 9 | A3(1.0) | B1(5.0) | 1.10 | 0.88 | |
| Inv. 10 | A3(1.0) | B1(7.0) | 0.81 | 0.90 | |
| Inv. 11 | A2(1.0) | B1(1.0) | 1.31 | 1.0 | |
| Inv. 12 | A2(1.0) | B2(1.0) | 1.30 | 1.0 | |
| Inv. 13 | A1(1.0) | B1(1.0) | 1.21 | 0.95 | |
| Inv. 14 | A1(1.0) | B2(1.0) | 1.23 | 0.96 | |
| Inv. 15 | A3(1.0) | B2(1.0) | 1.24 | 0.86 | |
| Inv. 16 | A2(1.0) | B3(1.0) | 1.30 | 0.94 | |
| Inv. 17 | A2(1.0) | B4(1.0) | 1.29 | 0.93 | |
| Inv. 18 | A2(1.0) | B5(1.0) | 1.25 | 0.93 | |
| Inv. 19 | A2(1.0) | B6(1.0) | 1.31 | 0.95 | |
| Inv. 20 | A2(1.0) | B7(1.0) | 1.27 | 0.94 | |

*Values in parentheses indicate the percentage by weight of a metal oxide or silane coupling agent, based on a phosphor.
**Discl: Discoloration
***Deli: Deliquescence

TABLE 2

| | Metal Oxide (%) | Silane Coupling Agent (%) | Initial Sensitivity | Moisture Resistance | Remark |
|---|---|---|---|---|---|
| Comp. 8 | A2(1.0) | — | 1.2 | 0 | Discl |
| Comp. 9 | — | B1(1.0) | 0.9 | 0 | Deli |
| Comp. 10 | — | B2(1.0) | 0.88 | 0 | Deli |
| Inv. 21 | A2(1.0) | B1(1.0) | 1.18 | 0.88 | |
| Inv. 22 | A2(1.0) | B2(1.0) | 1.15 | 0.85 | |

Example 3

Preparation of Radiation Image Conversion Panel

The reaction vessel was charged with 2500 ml of BaI₂ aqueous solution (1.75 mol/l) and 125 ml of EuI₃ aqueous solution (0.067 mol/l). Reaction mother liquor in the reaction vessel was maintained at a temperature of 83° C. with stirring, and thereto was added 250 ml of an aqueous solution of ammonium fluoride (8 mol/l) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. Then, to the phosphor crystals were added first super-fine metal oxide particles as shown in Table 3 with sufficiently stirring in a mixer to allow the super-fine metal oxide particles to uniformly adhere onto the phosphor crystal surface. In the Table, values in parentheses indicate the percentage by weight of the first metal oxide particles, based on the phosphor. The crystals were charged into a silica boat and calcined at 850° C. for 2 hrs. in an atmosphere of hydrogen gas, using a tube furnace to obtain europium activated barium fluoroiodide phosphor particles.

The resulting phosphor particles were immersed in a ethanol solution containing second metal oxide particles or a silane coupling agent as shown in Table 3 to form a slurry, ground in a mortar and dried at 80° C. for 3 hrs. In the Table, values in parentheses indicate the percentage by weight of the second metal oxide particles or silane coupling agent, based on the phosphor. The particles were subjected to classification to obtain particles with an average size of 7 μm. The used metal oxide particles and the silane coupling agent were as follows.

A1: Alumina particles with an average size of 13 nm

A2: Silica particles with an average size of 12 nm

A3: Silica particles with an average size of 16 nm which were subjected to a hydrophobicity-enhancing treatment (dimethyldichlorosilane-treatment)

B1: γ-mercaptopropyltrimethoxysilane

B2: γ-mercaptopropylmethyldimethoxysilane

B3: Vinyltriethoxysilane

B4: γ-glycidoxypropyltrimethoxysilane

B5: n-hexyltriethoxysilane

B6: γ-isocyanatopropyltrimethoxysilane

B7: methyltrimethoxysilane

Radiation image converting panels were prepared in a manner similar to Example 1. Thus, the prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a thickness of 230 μm. The resulting coated samples each were cut to a square of 10 cm×10 cm to obtain radiation image conversion panels.

Thus-obtained radiation image conversion panel samples were allowed to stand for 10 days under environment at 30° C. and 8% R.H. and evaluated with respect to moisture resistance in a manner similar to Example 1. Result thereof are shown in Table 3.

TABLE 3

| | First Metal Oxide (%) | Second Metal Oxide (%) | Silane Coupling Agent (%) | Sensitivity Initial | M.R.* |
|---|---|---|---|---|---|
| Comp. | — | — | — | 1.0 | 0 |
| Comp. | — | — | B1(1.0) | 0.98 | 0.22 |
| Inv. | A1(0.005) | — | B1(1.0) | 1.05 | 0.76 |
| Inv. | A1(0.01) | — | B1(1.0) | 1.10 | 0.85 |
| Inv. | A1(0.1) | — | B1(1.0) | 1.17 | 0.90 |
| Inv. | A1(1.0) | — | B1(1.0) | 1.20 | 1.0 |
| Inv. | A1(10.0) | — | B1(1.0) | 1.02 | 1.0 |
| Inv. | A1(15.0) | — | B1(1.0) | 0.88 | 1.0 |
| Inv. | A1(1.0) | — | B1(0.05) | 1.18 | 0.77 |
| Inv. | A1(1.0) | — | B1(0.1) | 1.18 | 0.93 |
| Inv. | A1(1.0) | — | B1(5.0) | 1.18 | 1.0 |
| Inv. | A1(1.0) | — | B1(7.0) | 0.93 | 1.0 |
| Inv. | A1(1.0) | — | B2(1.0) | 1.20 | 1.0 |
| Inv. | A1(1.0) | — | B3(1.0) | 1.20 | 1.0 |

TABLE 3-continued

| | First Metal Oxide (%) | Second Metal Oxide (%) | Silane Coupling Agent (%) | Sensitivity Initial | M.R.* |
|---|---|---|---|---|---|
| Inv. | A1(1.0) | — | B4(1.0) | 1.19 | 0.95 |
| Inv. | A1(1.0) | — | B5(1.0) | 1.20 | 0.98 |
| Inv. | A1(1.0) | — | B6(1.0) | 1.20 | 0.96 |
| Inv. | A1(1.0) | — | B7(1.0) | 1.20 | 0.94 |
| Inv. | A1(0.1) | A1(1.0) | B1(1.0) | 1.21 | 0.94 |
| Inv. | A1(0.1) | A1(2.0) | B1(1.0) | 1.20 | 0.96 |
| Inv. | A1(0.1) | A2(1.0) | B1(1.0) | 1.25 | 1.0 |
| Inv. | A1(0.1) | A2(2.0) | B1(1.0) | 1.25 | 1.0 |
| Inv. | A1(0.1) | A3(0.2) | B1(1.0) | 1.30 | 1.0 |
| Inv. | A1(0.1) | A3(1.0) | B1(1.0) | 1.35 | 1.0 |
| Inv. | A1(0.1) | A3(2.0) | B1(1.0) | 1.35 | 1.0 |
| Inv. | A1(0.1) | A3(3.0) | B1(1.0) | 1.32 | 1.0 |
| Inv. | — | A1(1.0) | B1(1.0) | 1.14 | 0.68 |
| Inv. | — | A2(1.0) | B1(1.0) | 1.19 | 0.72 |
| Inv. | — | A3(1.0) | B1(1.0) | 1.20 | 0.75 |

As can be seen therefrom, coating with metal oxide particles exhibited a tendency of enhancing the initial sensitivity. It is presumed that the metal oxide particles protected phosphor particles from damage such as crushing, dispersing and coating. The tendency of enhancing the initial sensitivity was marked in the use of silica particles which were subjected the hydrophobic-enhancing treatment, as the second metal oxide particles. According to the invention, as shown in the Table, there was obtained phosphor particles with enhanced sensitivity and improved moisture-resistance by coating the uncalcined phosphor particles with the first metal oxide particles and further coating the calcined phosphor particles with the second metal oxide particles and silane coupling agent.

Example 4

Preparation of Radiation Image Conversion Panel

The reaction vessel was charged with 2500 ml of BaI$_2$ aqueous solution (1.75 mol/l) and 125 ml of EuI$_3$ aqueous solution (0.067 mol/l). Reaction mother liquor in the reaction vessel was maintained at a temperature of 83° C. with stirring, and thereto was added 250 ml of an aqueous solution of ammonium fluoride (8 mol/l) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. Then, to the phosphor crystals were added first superfine metal oxide particles as shown in Table 4 with sufficiently stirring in a mixer to allow the super-fine metal oxide particles to uniformly adhere onto the phosphor crystal surface. The crystals were charged into a silica boat and calcined at 850° C. for 2 hrs. in an atmosphere of hydrogen gas, using a tube furnace to obtain europium activated barium fluoroiodide phosphor particles.

The resulting phosphor particles were immersed in a ethanol solution containing second metal oxide particles or a metal alkoxide as shown in Table 4 to form a slurry, ground in a mortar and dried at 80° C. for 3 hrs. The particles were subjected to classification to obtain particles with an average size of 7 μm. The used metal oxide particles and the metal alkoxide were as follows.

A1: Alumina particles with an average size of 13 nm

A2: Silica particles with an average size of 12 nm

A3: Silica particles with an average size of 7 nm which were subjected to a hydrophobicity-enhancing treatment (dimethyldichlorosilane-treatment)

C1: Aluminum triisopropoxide (dispersed in isopropanol)

C2: Aluminum tributoxide (dispersed in butanol)

C3: Zirconium tetrapropoxide (dispersed in propanol)

C4: Titanium tetraisopropoxide (dispersed in ethanol)

C5: Tetraethoxysilane (dispersed in ethanol)

C6: Barium diisopropoxide (dispersed in isopropanol)

Radiation image converting panels were prepared in a manner similar to Example 1. Thus, the prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a thickness of 230 $\mu$m. The resulting coated samples each were cut to a square of 10 cm×10 cm to obtain radiation image conversion panels. Thus-obtained radiation image conversion panel samples were allowed to stand for 10 days under environment at 30° C. and 80% R.H. and evaluated with respect to moisture resistance in a manner similar to Example 1. Result thereof are shown in Table 4.

TABLE 4

| | First Metal Oxide (%) | Second Metal Oxide (%) | Metal Alkoxide (%) | Sensitivity Initial | M.R.* |
|---|---|---|---|---|---|
| Comp. | — | — | — | 1.0 | 0 |
| Comp. | — | — | C1(1.0) | 0.99 | 0.35 |
| Inv. | A1(0.005) | — | C1(1.0) | 1.0 | 0.64 |
| Inv. | A1(0.01) | — | C1(1.0) | 1.10 | 0.80 |
| Inv. | A1(0.1) | — | C1(1.0) | 1.20 | 0.92 |
| Inv. | A1(1.0) | — | C1(1.0) | 1.15 | 1.0 |
| Inv. | A1(10.0) | — | C1(1.0) | 1.0 | 1.0 |
| Inv. | A1(20.0) | — | C1(1.0) | 0.86 | 1.0 |
| Inv. | A1(0.1) | — | C1(0.05) | 1.20 | 0.61 |
| Inv. | A1(0.1) | — | C1(0.1) | 1.20 | 0.81 |
| Inv. | A1(0.1) | — | C1(5.0) | 1.05 | 0.95 |
| Inv. | A1(0.1) | — | C1(10.0) | 0.86 | 0.95 |
| Inv. | A1(0.1) | A1(1.0) | C1(1.0) | 1.20 | 0.96 |
| Inv. | A1(0.1) | A2(1.0) | C1(1.0) | 1.20 | 1.0 |
| Inv. | A1(0.1) | A3(1.0) | C1(1.0) | 1.24 | 1.0 |
| Inv. | A1(0.1) | A3(1.0) | C2(1.0) | 1.24 | 0.97 |
| Inv. | A1(0.1) | A3(1.0) | C3(1.0) | 1.24 | 0.90 |
| Inv. | A1(0.1) | A3(1.0) | C4(1.0) | 1.24 | 0.92 |
| Inv. | A1(0.1) | A3(1.0) | C5(1.0) | 1.24 | 0.98 |
| Inv. | A1(0.1) | A3(1.0) | C6(1.0) | 1.24 | 0.87 |
| Inv. | A2(0.1) | — | C1(1.0) | 0.78 | 0.95 |
| Inv. | — | A1(1.0) | C2(1.0) | 1.05 | 0.65 |
| Inv. | — | A2(1.0) | C2(1.0) | 1.04 | 0.67 |
| Inv. | — | A3(1.0) | C2(1.0) | 1.05 | 0.78 |

*M.R.: Moisture Resistance

In the Table, values in parentheses indicate the percentage by weight of the metal oxide or metal alkoxide, based on the phosphor. As can be seen therefrom, coating with metal oxide particles exhibited a tendency of enhancing the initial sensitivity. It is presumed that the metal oxide particles protected phosphor particles from damage in dispersing and coating. The tendency of enhancing the initial sensitivity was marked in the use of silica particles which were subjected the hydrophobic-enhancing treatment, as the second metal oxide particles. According to the invention, as shown in the Table, there were obtained phosphor particles with enhanced sensitivity and improved moisture-resistance by coating the uncalcined phosphor particles with the first metal oxide particles and further coating the calcined phosphor particles with the second metal oxide particles and metal alkoxide.

Example 5
Preparation of Radiation Image Conversion Panel

The reaction vessel was charged with 2500 ml of BaI$_2$ aqueous solution (1.75 mol/l) and 125 ml of EuBr$_3$ aqueous solution (0.067 mol/l). Reaction mother liquor in the reaction vessel was maintained at a temperature of 83° C. with stirring, and thereto was added 250 ml of an aqueous solution of ammonium fluoride (8 mol/l) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafine-grained alumina was added thereto in an amount of 1% by weight, with stirring sufficiently to cause the alumina to adhere uniformly to the surface of the crystals. The crystals were charged into a silica boat and calcined at 850° C. for 2 hrs. in an atmosphere of hydrogen gas, using a tube furnace to obtain europium activated barium fluoroiodide phosphor particles. The particles were subjected to classification to obtain particles with an average size of 3 $\mu$m.

Radiation image converting panels were prepared in a manner similar to Example 1. The prepared panels each were cut to a phosphor sheet in a square form of 5 cm×5 cm. Using various laminated protective films having alumina-deposited PET resin layer as shown in Table 5, peripheral portions of the phosphor sheet were sealed by heat-adhering under reduced pressure using an impulse sealer. Heat adhesion was so performed that the distance from the heat-adhered portion to the periphery of the phosphor sheet was 1 mm. The impulse sealer used for heat adhesion was one having a heater with a width of 3 mm. A protective film of the support-side of the phosphor sheet was a dry-laminated film comprised of cast polypropylene (CPP) of 30 $\mu$m/aluminum film of 9 $\mu$m/polyethylene terephthalate (PET) of 188 $\mu$m, in which the adhesive layer thickness was 3.0 $\mu$m and two liquid-reactive urethane type adhesive was used. In Table 5, VMPET indicates alumina-deposited PET (commercially available from Toyo Metalizing Co.).

Evaluation of Radiation Image Conversion Panel (1) Evaluation of Sharpness:

The panel was exposed to X-rays at 80 Kvp through a lead-made MTF chart and then excited by the He-Ne laser. Then, the stimulated emission emitted from the phosphor layer was detected and converted to electric signal. The electric signals were subjected to analog/digital conversion and recorded in a magnetic recording tape. The X-ray image recorded in the magnetic tape was analyzed by a computer. Thus, the sharpness of the image was evaluated according to the modulation transfer function at the spatial frequency of 2 cycles/mm (%) of the X-ray image recorded in the magnetic tape. In this case, the higher the MTF value, the better sharpness.

(2) Evaluation of Image Density Uniformity:

The panel was exposed to X-rays at 80 kVp and then excited by the light of a He-Ne laser (633 nm). Then, the stimulated emission emitted from the phosphor layer was detected by a detector (photomultiplier with spectral sensitivity of S-5) and converted to electric signal. The electric signals were reproduced as images by an image reproducing apparatus and printed with a magnification of 5 time. The resulting printed images were visually evaluated with respect to appearance of uneven image densities of unevenness with a period of less than 1 mm (denoted as "<1 mm") and with a period of not less than 1 mm (denoted as "≧1 mm"), based on grade 0, in which no unevenness occurred; and grade 5, in which unevenness the most markedly occurred. Results theeof are shown in Table 5.

TABLE 5

| Sample | Arrangement of Protective Film | Sharpness (MTF) | Uneven Density (<1 mm) | Uneven Density (≧1 mm) |
|---|---|---|---|---|
| 5-1 | PET12///VMPET12\|PE15\|LDPE30 | 36 | 0 | 1 |
| 5-2 | PET12///VMPET12///PET12///CPP20 | 36 | 0 | 1 |
| 5-3 | PET12///VMPET12//PET12///CPP20 | 35 | 1 | 1 |
| 5-4 | PET12///VMPET12///PET12//CPP20 | 35 | 1 | 1 |
| 5-5 | PET12//VMPET12///PET12///CPP20 | 35 | 1 | 1 |
| 5-6 | PET12//VMPET12//PET12//CPP20 | 34 | 3 | 2 |
| 5-7 | PET12/VMPET12/PET12/CPP20 | 33 | 5 | 3 |
| 5-8 | NY15///VMPET12///VMPET12\|PE15\|LDPE30 | 35 | 0 | 1 |
| 5-9 | NY15///VMPET12///VMPET12///PET12///CPP20 | 35 | 0 | 1 |
| 5-10 | NY15///VMPET12//VMPET12///PET12///CPP20 | 34 | 1 | 2 |
| 5-11 | NY15///VMPET12///VMPET12/PET12///CPP20 | 33 | 2 | 2 |
| 5-12 | NY15//VMPET12//VMPET12//PET12//CPP20 | 32 | 4 | 3 |
| 5-13 | NY15///VMPET12///VMPET12///PET12///CPP20 | 35 | 0 | 2 |
| 5-14 | NY15///VMPET12//VMPET12//PET12///CPP20 | 34 | 2 | 3 |
| 5-15 | NY15//VMPET12//VMPET12///PET12/CPP20 | 33 | 3 | 4 |
| 5-16 | NY15//VMPET12/VMPET12//PET12//CPP20 | 32 | 5 | 5 |
| 5-17 | PET12///VMPET12\|PE15\|m-LDPE30 | 36 | 0 | 0 |
| 5-18 | PET12///VMPET12///PET12///m-CPP20 | 36 | 0 | 0 |
| 5-19 | NY15///VMPET12///VMPET12\|PE15\|m-LDPE30 | 35 | 0 | 0 |
| 5-20 | NY15///VMPET12///VMPET12///PET12///m-CPP20 | 35 | 0 | 0 |
| 5-21 | NY15///VMPET12///VMPET12///VMPET12///m-CPP20 | 35 | 0 | 0 |

In the Table, the symbols "/", "//" and "///" each mean a dry-laminated adhesive layer and the adhesive layer thickness of 1.5 μm, 2.5 μm and 3.0 μm, respectively. An adhesive used was a two liquid-reactive type adhesive. Further, in the Table, the symbol "|" means a laminated layer formed by the extruding lamination process or co-extruding lamination process, in which no hardenable adhesive layer intervenes, and the symbol "m-" at the top of CPP or LDPE means a resin layer containing 0.5% by weight of silica particles. "LDPE", "PET", "PE", "NY" and "CPP" indicate low density polyethylene, polyethylene terephthalate, polyethylene, nylon, and casting polypropylene resin layers, respectively. The number following each resin layer indicates a layer thickness (μm).

Comparative Example 1
Preparation of Phosphor Plate

A precursor of a europium activated barium fluoroiodide stimulable phosphor was prepared as follows. The reaction vessel was charged with 2500 ml of $BaI_2$ aqueous solution (4.0mol/l) and 26.5 ml of $EuBr_3$ aqueous solution (0.2 mol/l). Reaction mother liquor in the reaction vessel was maintained at a temperature of 83° C. with stirring, and thereto was added 322 ml of an aqueous solution of ammonium fluoride (8 mol/l) by using a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafinegrained alumina was added thereto in an amount of 1% by weight, with stirring sufficiently to cause the alumina to adhere uniformly to the surface of the crystals. The crystals were charged into a silica boat and calcined at 850° C. for 2 hrs. in an atmosphere of hydrogen gas, using a tube furnace to obtain europium activated barium fluoroiodide stimulable phosphor particles. The particles were further subjected to classification to obtain particles with a 2 μm average size.

Using the stimulable phosphor particles, a phosphor plate (having a phosphor layer of 300 μm in thick) was prepared in a manner similar to Example.

The prepared phosphor sheet was cut to a phosphor sheet in a square form of 5 cm×5 cm. Using a laminated protective film having alumina-deposited PET resin layer as shown below (A), peripheral portions of the phosphor sheet were sealed by heat-adhering under reduced pressure using an impulse sealer. Heat adhesion was so performed that the distance from the heat-adhered portion to the periphery of the phosphor sheet was 1 mm. The impulse sealer used for heat adhesion was one having a heater with a width of 3 mm. A protective film of the support-side of the phosphor sheet was a dry-laminated film comprised of cast polypropylene (CPP) of 30 μm/aluminum film of 9 μm/ polyethylene terephthalate (PET) of 188 μm, in which the adhesive layer thickness was 1.5 μm and two liquid-reactive urethane type adhesive was used.

(A) NY15///VMPET12///VMPET///PET12////m-CPP20

Example 6

Phosphor particles obtained after calcination in Comparative Example 1 described above were dispersed in an ethanol solution maintained at 45° C. and containing metal oxide particles (A0) and a silane coupling agent (B1), as shown below and stirred for 10 min. The amount of ethanol used was 75% by weight, based on the phosphor. After allowed to stand for 5 hrs. the phosphor particles were filtered and dried at 80° C. for 12 hrs. After further subjected to a heating treatment at 120° C. for 3 hrs., the phosphor particles were classified to obtain stimulable phosphor particles of a 2 μm average size.

A0: Silica particles with an average size of 12 nm which were subjected to a hydrophobicity-enhancing treatment (produced by Japan Aerozyl Co., dimethyldichlorosilane-treated product) 1 wt. %

B1: γ-Mercaptopropyltrimethoxysilane (produced by TorayDow Corning Co.) 1 wt. %

Using the obtained phosphor particles, a phosphor plate was prepared and sealed in a manner similar to Compative Example 1.

Example 7

A sealed phosphor plate was prepared in a manner similar to Example 6, except that ethanol was replaced by isopropanol and the silane coupling agent was replaced by a metal alkoxide (C1), as shown below.

C1: Aluminum triisopropoxide (available from Kanto Kagaku Co.) 1 wt. %

Example 8

A sealed phosphor plate was prepared in a manner similar to Example 6, except that prior to calcination, a first metal oxide particles (A1), as shown below, were added to phosphor precursor particles and sufficiently stirred with a mixer to allow the metal oxide particles to adhere onto the phosphor precursor particles.

A1: Alumina particles with a 13 nm average size (available from Japan Aerozyl Co.) 0.1 wt. %

Example 9

To phosphor precursor particles prepared in a manner similar to Comparative Example 1, a first metal oxide particles (A1) were added and sufficiently stirred with a mixer to allow the metal oxide particles to adhere onto the phosphor precursor particles. The precursor particles were similarly calcined to obtain phosphor particles. The phosphor particles were dispersed in an ethanol solution maintained at 45° C. and containing a silane coupling agent (B1), as shown below and stirred for 10 min. The amount of ethanol used was 75% by weight, based on the phosphor. After allowed to stand for 5 hrs. the phosphor particles were filtered and dried at 80° C. for 12 hrs. After further subjected to a heating treatment at 120° C. for 3 hrs., the phosphor particles were classified to obtain stimulable phosphor particles of a 2 μm average size.

A1: Alumina particles with a 13 μm average size (available from Japan Aerozyl Co. 1.0 wt. %

B1: γ-Mercaptopropyltrimethoxysilane (produced by Toray-Dow Corning Co.) 1 wt. %

A sealed phosphor plate was prepared in a manner similar to Comparative Example 1.

Example 10

A sealed phosphor plate was prepared in a manner similar to Example 2, except that prior to calcination, a first metal oxide particles (A1) was added and sufficiently y stirred with a mixer to allow the metal oxide particles to adhere onto the phosphor precursor particles.

A1: Alumina particles of av. 13 nm (available from Japan Aerozyl Co.) 0.1 wt. %

Example 11

A sealed phosphor plate was prepared in a manner similar to Example 9, except that ethanol was replaced by isopropanol and the silane coupling agent was replaced by a metal alkoxide (C1), as shown below.

C1: Aluminum triisopropoxide (available from Kanto Kagaku Co.) 1 wt. %

Example 12

Phosphor precursor particles prepared similarly to Comparative Example 1 were dispersed in an isopropanol solution maintained at 45° C. and containing a metal alkoxide (C1), stirred for 10 min., after allowed to stand for 1 hr., filtered and dried in vacuo, and calcined similarly to Comparative Example 1 to obtain phosphor particles. The phosphor particles were dispersed in an isopropanol solution maintained at 45° C. and containing metal oxide particles (A0) and a second metal alkoxide (C1') and stirred for 10 min. The amount of ethanol used was 75% by weight, based on the phosphor. After allowed to stand for 5 hrs. the phosphor particles were filtered and dried at 80° C. for 12 hrs. After further subjected to a heating treatment at 120° C. for 3 hrs., the phosphor particles were classified to obtain stimulable phosphor particles of a 2 μm average size.

C1: Aluminum triisopropoxide (available from Kanto Kagaku Co.) 0.2 wt. %

C1': Aluminum triisopropoxide (available from Kanto Kagaku Co.) 1.0 wt. %

A0: Silica particles with an average size of 7 nm which were subjected to a hydrophobicity-enhancing treatment (produced by Japan Aerozyl Co., dimethyldichlorosilane-treated product) 1 wt. %

A sealed phosphor plate was prepared in a manner similar to Comparative Example 1.

Example 13

A sealed phosphor plate was prepared in a manner similar to Example 12, except that isopropanol was replaced by ethanol and the metal alkoxide was replaced by another metal alkoxide (C2 and 2').

C2: Aluminum triethoxide (available from Kanto Kagaku Co.) 0.2 wt. %

C2': Aluminum triethoxide (available from Kanto Kagaku Co.) 1.0 wt. %

Example 14

A sealed phosphor plate was prepared in a manner similar to Example 12, except that isopropanol used for dispersing the phosphor precursor particles was replaced by ethanol and the first metal alkoxide (C1) was replaced by another metal alkoxide (C2)

C2: Aluminum triethoxide (available from Kanto Kagaku Co.) 0.2 wt. %

Example 15

A sealed phosphor plate was prepared in a manner similar to Example 12, except that isopropanol used for dispersing the phosphor precursor particles was replaced by ethanol and the second metal alkoxide (C1') was replaced by a silane coupling agent (B1)

B2: γ-Mercaptopropyltrimethoxysilane (produced by Toray Dow Corning Co.) 1 wt. %

Example 16

A sealed phosphor plate was prepared in a manner similar to Example 13, except that the second metal alkoxide (C2') was replaced by a silane coupling agent (B1)

B1: γ-Mercaptopropyltrimethoxysilane (produced by Toray Dow Corning Co.) 1 wt. %

Example 17

Phosphor precursor particles prepared similarly to Comparative Example 1 were dispersed in an isopropanol solution maintained at 45° C. and containing a first metal oxide particles (A1) and a first metal alkoxide (C1), stirred for 10 min., after allowed to stand for 1 hr., filtered and dried in vacuo, and calcined similarly to Comparative Example 1 to obtain phosphor particles. The phosphor particles were dispersed in an isopropanol solution maintained at 45° C. and containing a second metal alkoxide (C1') and stirred for 10 min. After allowed to stand for 5 hrs. the phosphor particles were filtered and dried at 80° C. for 12 hrs. After further subjected to a heating treatment at 120° C. for 3 hrs., the phosphor particles were classified to obtain stimulable phosphor particles of a 2 $\mu$m average size.

C1: Aluminum triisopropoxide (available from Kanto Kagaku Co.) 0.2 wt. %

C1': Aluminum triisopropoxide (available from Kanto Kagaku Co.) 1.0 wt. %

A1: Alumina particles of av. 13 nm (available from Japan Aerozyl Co.) 0.1 wt. %

A sealed phosphor plate was prepared in a manner similar to Comparative Example 1.

Example 18

A sealed phosphor plate was prepared in a manner similar to Example 17, except that isopropanol used for dispersing phosphor particles was replaced by ethanol and the second metal alkoxide (C1') was replaced by another metal alkoxide (C2').

C2': Aluminum triethoxide (available from Kanto Kagaku Co.) 1.0 wt. %

Example 19

A sealed phosphor plate was prepared in a manner similar to Example 18, except that the second metal alkoxide (C1') was replaced by a silane coupling agent (B1).

B1: γ-Mercaptopropyltrimethoxysilane (produced by Toray Dow Corning Co.) 1 wt. %

Example 20

Phosphor precursor particles prepared similarly to Comparative Example 1 were dispersed in an isopropanol solution maintained at 45° C. and containing a first metal oxide particles (A1) and a first metal alkoxide (C1), stirred for 10 min., after allowed to stand for 1 hr., filtered and dried in vacuo, and calcined similarly to Comparative Example 1 to obtain phosphor particles. The phosphor particles were dispersed in an isopropanol solution maintained at 45° C. and containing second metal oxide particles (A0) a second metal alkoxide (C1') and stirred for 10 min. After allowed to stand for 5 hrs. the phosphor particles were filtered and dried at 80° C. for 12 hrs. After further subjected to a heating treatment at 120° C. for 3 hrs., the phosphor particles were classified to obtain stimulable phosphor particles of a 2 $\mu$m average size.

C1: Aluminum triisopropoxide (available from Kanto Kagaku Co.) 0.2 wt. %

C1': Aluminum triisopropoxide (available from Kanto Kagaku Co.) 1.0 wt. %

A1: Alumina particles of av. 13 nm (available from Japan Aerozyl Co.) 0.1 wt. %

A0: Silica particles with an average size of 7 nm which were subjected to a hydrophobicity-enhancing treatment (produced by Japan Aerozyl Co., dimethyldichlorosilane-treated product) 1 wt. %

A sealed phosphor plate was prepared in a manner similar to Comparative Example 1.

Example 21

A sealed phosphor plate was prepared in a manner similar to Example 20, except that isopropanol used for dispersing the phosphor particles was replaced by ethanol and the second metal alkoxide (C1') was replaced by a silane coupling agent (B1).

B1: γ-Mercaptopropyltrimethoxysilane (produced by Toray Dow Corning Co.) 1 wt. %

Evaluation of Moisture Resistance

Phosphor plate samples of Comparative Example 1 and Example 6 to 21 each were allowed to stand under environment at 40° C. and 95% R.H. for 3 months, and evaluated with respect to moisture resistance in a manner similar to Example 1. Results thereof are shown in Table 6. In the Table, initial sensitivities were shown as a relative value, based on the sensitivity of Comparative Example 1 being 1.00.

TABLE 6

| Sample | Initial Sensitivity | Moisture Resistance |
| --- | --- | --- |
| Comp. 1 | 1.0 | 0.34 |
| Example 6 | 1.33 | 0.73 |
| Example 7 | 1.19 | 0.65 |
| Example 8 | 1.36 | 0.95 |
| Example 9 | 1.14 | 0.83 |
| Example 10 | 1.13 | 0.85 |
| Example 11 | 1.03 | 0.70 |
| Example 12 | 1.15 | 0.76 |
| Example 13 | 1.12 | 0.73 |
| Example 14 | 1.13 | 0.75 |
| Example 15 | 1.36 | 0.87 |
| Example 16 | 1.34 | 0.88 |
| Example 17 | 1.06 | 0.84 |
| Example 18 | 1.07 | 0.85 |
| Example 19 | 1.22 | 0.90 |
| Example 20 | 1.12 | 0.93 |
| Example 21 | 1.32 | 0.98 |

What is claimed is:

1. A method for preparing a stimulable phosphor comprising the steps of:

(1) forming a stimulable phosphor and (2) coating the formed stimulable phosphor with a metal oxide and a silane coupling agent, or metal oxide particles and a metal alkoxide.

2. The method of claim 1, wherein said silane coupling agent contains a mercapto group.

3. The method of claim 1, wherein said silane coupling agent contains a vinyl group.

4. The method of claim 1, wherein in step (2), the formed stimulable phosphor is coated with metal oxide particles in an amount of 0.05 to 10% by weight, based on the stimulable phosphor, and a silane coupling agent or metal alkoxide in an amount of 0.1 to 5% by weight, based on the stimulable phosphor.

5. The method of claim 1, wherein said metal oxide particles have been subjected to a hydrophobicity-enhancing treatment.

6. The method of claim 1, wherein said metal oxide particles are particles of metal oxides selected from the group consisting of silica, alumina and titanium oxide.

7. The method of claim 1, wherein said stimulable phosphor comprises Ba, F, XA, and Ln, in which XA is at least one selected from the group consisting of F, Cl, Br, I, At, Yb and No; and Ln is at lest one selected from the group consisting of Ce, Pr, Sm, Eu, Gd, Tb, Tm, Dy, Ho, Nd, Er and Yb.

8. The method of claim 7, wherein said stimulable phosphor is represented by formula (1):

$$(Ba_{1-x}M^1)FX{:}_yM^2{,}_zLn$$

wherein M1 represents a metal selected from the group consisting of Mg, Ca, Sr, Zn and Cd; $M^2$ represents an alkali metal selected from the group consisting of Li, Na, K, Rb and Cs; X represents a halogen selected from the group consisting of Cl, Br and I; and Ln represents a rare earth element selected from the group consisting of Ce, Pr, Sm, Eu, Gd, Tb, Tm, Dy, Ho, Nd, Er and Yb; and wherein x, y and z each represent $0 \leq x \leq 0.6$, $0 \leq y \leq 0.05$, $0 \leq z \leq 0.2$.

9. A method for preparing a stimulable phosphor comprising the steps of:

(1) forming a stimulable phosphor precursor, (2) calcining the formed precursor in the presence of first metal oxide particles, and (3) coating the calcined precursor with a silane coupling agent or metal alkoxide.

10. The method of claim 9, wherein said silane coupling agent contains a mercapto group.

11. The method of claim 9, wherein said silane coupling agent contains a vinyl group.

12. The method of claim 9, wherein in step (2), the formed stimulable phosphor is coated with a silane coupling agent or metal alkoxide in an amount of 0.1 to 5% by weight, based on the stimulable phosphor.

13. The method of claim 9, wherein said metal oxide particles is one which has been subjected to a hydrophobicity-enhancing treatment.

14. The method of claim 9, wherein said first metal oxide is selected from the group consisting of silica, alumina and titanium oxide.

15. The method of claim 9, wherein the step (3) is coating the calcined precursor with a silane coupling agent and a second metal oxide, or a metal alkoxide and a second metal oxide.

16. The method of claim 15, wherein said first metal oxide is alumina, said second metal oxide being silica.

17. The method of claim 9, wherein said stimulable phosphor comprises Ba, F, XA, and Ln, in which XA is at least one selected from the group consisting of F, Cl, Br, I, At, Yb and No; and Ln is at lest one selected from the group consisting of Ce, Pr, Sm, Eu, Gd, Tb, Tm, Dy, Ho, Nd, Er and Yb.

18. The method of claim 17, wherein said stimulable phosphor is represented by formula (1):

$$(Ba_{1-x}M^1)FX{:}_yM^2{,}_zLn$$

wherein $M^1$ represents a metal selected from the group consisting of Mg, Ca, Sr, Zn and Cd; $M^2$ represents an alkali metal selected from the group consisting of Li, Na, K, Rb and Cs; X represents a halogen selected from the group consisting of Cl, Br and I; and Ln represents a rare earth element selected from the group consisting of Ce, Pr, Sm, Eu, Gd, Tb, Tm, Dy, Ho, Nd, Er and Yb.

19. A method for preparing a stimulable phosphor comprising the steps of:

(1) forming a stimulable phosphor precursor, (2) calcining the formed precursor in the presence of a metal alkoxide, and (3) coating the calcined precursor with a silane coupling agent and metal oxide, or metal alkoxide and metal oxide.

20. The method of claim 19, wherein after step (1) and prior to step (2), the method further comprising:

(1A) allowing said metal alkoxide to adhere to the formed precursor, and step (2) is calcining the metal alkoxide-adhered precursor.

21. The method of claim 20, wherein step (1A) is immersing the formed precursor in a solution containing said metal alkoxide.

22. A method for preparing a stimulable phosphor comprising the steps of:

(1) forming a stimulable phosphor precursor, (2) calcining the formed precursor in the presence of a first metal alkoxide and a first metal oxide particle, and (3) coating the calcined precursor with a silane coupling agent or a second metal alkoxide.

23. The method of claim 22, wherein step (3) is coating the calcined precursor with a silane coupling agent and second metal oxide particles, or a second metal alkoxide and a second metal oxide.

24. The method of claim 22, wherein after step (1) and prior to step (2), the method further comprising:

(1A) allowing said first metal alkoxide and first metal oxide to adhere to the formed precursor, and step (2) is calcining the first metal alkoxide and first metal oxide-adhered precursor.

25. The method of claim 24, wherein step (1A) is immersing the formed precursor in a solution containing said first metal alkoxide and first metal oxide.

26. A method for preparing a radiation image conversion panel comprising the step of:

forming a phosphor layer containing a stimulable phosphor prepared according to the method as claimed in claim 1.

27. The method of claim 26, wherein the method further comprising the step of:

forming a protective layer on the phosphor layer.

28. A method for preparing a radiation image conversion panel comprising the step of:

forming a phosphor layer containing a stimulable phosphor prepared according to the method as claimed in claim 9.

29. The method of claim 28, wherein the method further comprising the step of:

forming a protective layer on the phosphor layer.

30. A method for preparing a radiation image conversion panel comprising the step of:

forming a phosphor layer containing a stimulable phosphor prepared according to the method as claimed in claim 19.

31. The method of claim 30, wherein the method further comprising the step of:

forming a protective layer on the phosphor layer.

32. A method for preparing a radiation image conversion panel comprising the step of:

forming a phosphor layer containing a stimulable phosphor prepared according to the method as claimed in claim 22.

33. The method of claim 28, wherein the method further comprising the step of:

forming a protective layer on the phosphor layer.

* * * * *